(12) United States Patent
Fraser et al.

(10) Patent No.: US 7,827,183 B2
(45) Date of Patent: Nov. 2, 2010

(54) RECOGNITION OF PATTERNS IN DATA

(75) Inventors: Andrew John Fraser, Ipswich (GB);
Edward C. Stanton, County Durham (GB); Oliver J. Downing, Cambridge (GB)

(73) Assignee: CustoMiser Limited, Ipswich (GB)

( * ) Notice: Subject to any disclaimer, the term of this patent is extended or adjusted under 35 U.S.C. 154(b) by 351 days.

(21) Appl. No.: 10/803,520

(22) Filed: Mar. 17, 2004

(65) Prior Publication Data
US 2005/0015376 A1    Jan. 20, 2005

(30) Foreign Application Priority Data

Mar. 19, 2003   (GB) ................................ 0306236.1
Mar. 25, 2003   (GB) ................................ 0306777.4

(51) Int. Cl.
*G06F 7/00* (2006.01)

(52) U.S. Cl. ...................... 707/748; 707/705; 707/736; 707/749; 707/758

(58) Field of Classification Search .................. 705/10; 706/1–9; 707/101, 100, 1, 10, 104.1, 2, 3, 707/200
See application file for complete search history.

(56) References Cited

U.S. PATENT DOCUMENTS

| | | | |
|---|---|---|---|
| 6,064,980 A * | 5/2000 | Jacobi et al. .................. 705/26 |
| 6,236,975 B1 * | 5/2001 | Boe et al. ...................... 705/7 |
| 6,430,546 B1 | 8/2002 | Stewart et al. |
| 6,662,192 B1 * | 12/2003 | Rebane .................... 707/104.1 |
| 7,006,980 B1 * | 2/2006 | Snyder ........................ 705/10 |
| 2002/0147625 A1 * | 10/2002 | Kolke, Jr. ...................... 705/9 |
| 2003/0204436 A1 * | 10/2003 | Flender et al. ................ 705/10 |
| 2003/0204437 A1 * | 10/2003 | Flender et al. ................ 705/10 |
| 2005/0209907 A1 * | 9/2005 | Williams ..................... 705/10 |

* cited by examiner

*Primary Examiner*—Hung Q Pham
(74) *Attorney, Agent, or Firm*—Townsend and Townsend and Crew LLP

(57) ABSTRACT

A system is disclosed for recognition of patterns in data. It has particular application to a data management system for managing data relating to customers and transactions, the aim being to derive predictive information relating to the future behavior of customers. The system comprises an analysis engine for analysing relationships between responses made by a user to questions relating to a service or products, in which the analysis is of responses made by a customer to one or more constructs. The system operates by subjecting data relating to the opinions of customers to a process of fuzzy entailment such that meaningful conclusions can be drawn when data is an imprecise match with a set of conditions.

15 Claims, 8 Drawing Sheets

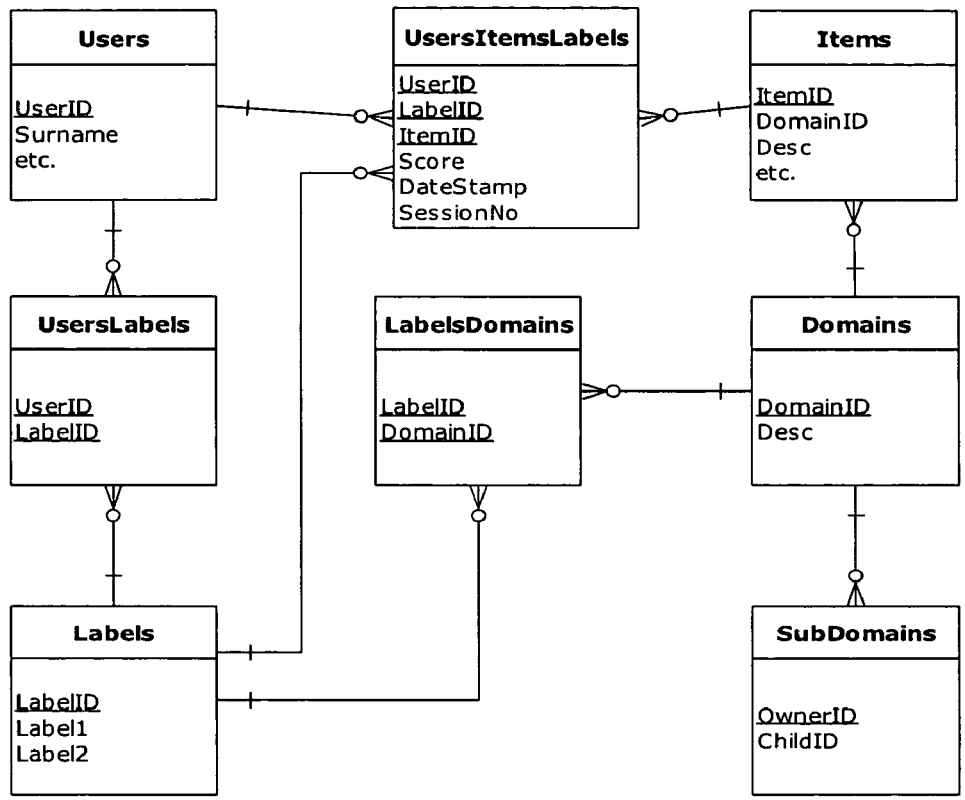

Terminology:
Label is a synonym for construct or attribute-pair,
e.g.: patchy — comprehensive or, superficial — in-depth;
Domain is a synonym for area or perhaps type,
e.g.: books, cookery books, eastern cookery, thai cooking.
Note the SubDomain stores information about the kind of hierarchy I've just used wherein thai cooking is a subset of the class eastern cookery, etc..
Items is a synonym for element or product.

Fig 4

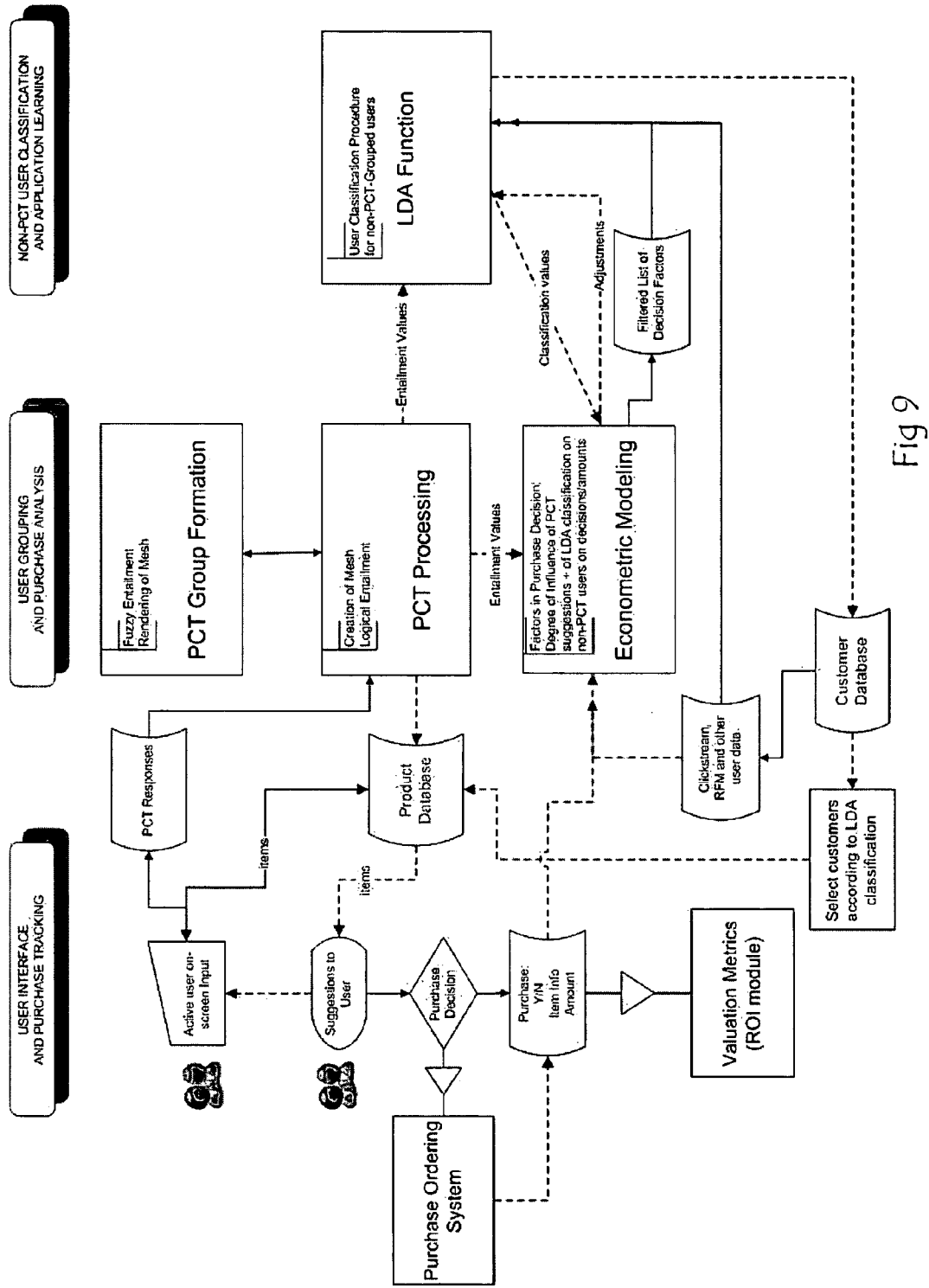

RECOGNITION OF PATTERNS IN DATA

BACKGROUND TO THE INVENTION

Field of the Invention

This invention relates to recognition of patterns in data. In particular, it relates to a system that allows an organisation to obtain intelligence from its data that is not available using conventional data management systems. Most particularly, it is suitable for recognition of patterns in data relating to an organisation's customers.

Understanding data that is accumulated within an enterprise is both an art and a science. In many cases, there is information within the data that is potentially of great value, but cannot be readily accessed.

Traditionally, data relating to an enterprise was maintained in paper records, and automated analysis of it was not possible. Predictive analysis of data was typically restricted to reliance upon the knowledge of one or more persons and their subjective reaction to particular occurrences within the enterprise. While a suitably skilled person might be able to obtain predictive information from such paper records, it is not ideal. A company's fortune can be tied to the health and loyalty of a small number of individuals. Moreover, there is simply a limit to the amount of data that a person is capable of processing. Detailed analysis of the data collected by even a relatively small enterprise is beyond the capabilities of even the most exceptional person.

A particular example is data that relates to the customers of an enterprise. All customers are unique, and to understand their motivations and behaviours at any given point in time, they need to be treated that as individuals. This is generally referred to as "customer relationship management" (CRM). A person can maintain an accurate assessment of a few hundred customers at most, and then only if they have knowledge of the customers' behaviours and preferences. Customer relations management for a larger number of customers or where customers' transactions are handled predominantly by automated electronic systems ceases to be a task for human analysts and instead becomes a technical problem that must be assigned to automated systems.

Automated CRM systems are in a state of rapid and sustained growth because putting the customer at the heart of the business process is recognised as the most critical way to minimise churn: where customers desert their existing suppliers for new ones. Companies using such systems can, through developing a unique understanding of their customers, help them to realise more interesting, relevant and rewarding outcomes from their interaction with the company while simultaneously reducing costs associated with customer attraction and retention.

There are many other data records that are routinely maintained by a company. For example, relating to production and quality management. In this context, predictive analysis of data can identify likely problems in production that could leas to a loss of quality before they occur.

SUMMARY OF THE INVENTION

Therefore, an aim of the invention is to provide a data management system that can obtain predictive information from a large database relating to past activities and make predictions as to future events from that data. It has as a special aim the implementation of a predictive technique in CRM that matches customers to items of potential interest. It is also an aim of the invention to provide a CRM system that has an interface design using key features of personal construct psychology. This can be achieved through a combination of logical entailment and fuzzy logic (fuzzy entailment) for inference modelling and self-learning at the individual and group level. A combination of fuzzy entailment and inverse Mills ratio calculations with Tobit, Logit or Probit experimental modelling can produce self-learning at the group and application level.

This specification refers throughout to 'products' and 'customers' due to the immediate usefulness for generating improvements in customer satisfaction and client revenues. The terms 'items of interest' and 'users' are equally applicable. The system can be used by providers of products, services, events and so forth, and these will be referred to generally as 'things'.

From a first aspect, this invention provides a data management system for managing data relating to customers and transactions, the system comprising an analysis engine for analysing relationships between responses made by a user to questions relating to a service or products, in which the analysis of responses made by a customer to one or more constructs.

Such constructs, if carefully created, can generate detailed analysis of a user's opinions and preferences.

It has been found that particularly advantageous can be constructed where the analysis involves a process of fuzzy entailment.

Typically, each construct includes two distinct descriptive terms relating to things provided to customers by operators of the system. These should be perceived by the user as opposite extremes of a range of opinions about a thing. Therefore, the descriptive terms of each construct may represent contrasting opinions of the thing. A system embodying the invention typically obtains data from a user that represents a user's opinion of the thing in a range defined by the descriptive terms.

In typical embodiments, the construct is represented by visual control displayed in a graphical user interface on a computer screen. In such cases, the user can input a value representative of their opinion by adjustment of the position of the control. This provides visual feedback to the user of the value that they wish to input.

The results of the analysis may be used to provide deduce which items of information will be of interest to a particular customer.

In a typical configuration, a data management system according to any preceding claim executes on a server that communicates with a user over a network link, which will typically include the Internet. Such a system usually includes a user data input component that executes in on a remote host system. For example, the data input component may be represented in the display generated by a web browser. To further increase the versatility of the system, the data input component may be generated by an applet that is downloaded to the remote host from the server.

A data management system embodying the invention is advantageously able to process incomplete data. This is because, in many cases, a user may not input complete data either because the data is not available or simply through disinclination. Such incomplete data may be processed by matching those parts of the data that are present with characteristics of existing data. For example, the incomplete data may be subject to discriminant analysis.

Since the system must deal with data that relates to opinion, it is necessary to represent the data in a linear, numeric manner. Therefore, in typical embodiments of the invention subject the data to a process of linearisation prior to analysis. It may be that the process of linearisation includes conversion of non-numeric data to a numeric form.

Typical embodiments of the system are implemented as a computer software system.

BRIEF DESCRIPTION OF THE DRAWINGS

FIG. 4 represents the logical relationships among the entities within the application;

FIG. 9 is a process diagram that illustrates operation of an embodiment as a whole.

DETAILED DESCRIPTION OF THE ACCOMPANYING DRAWINGS

Overview

Figure 8:
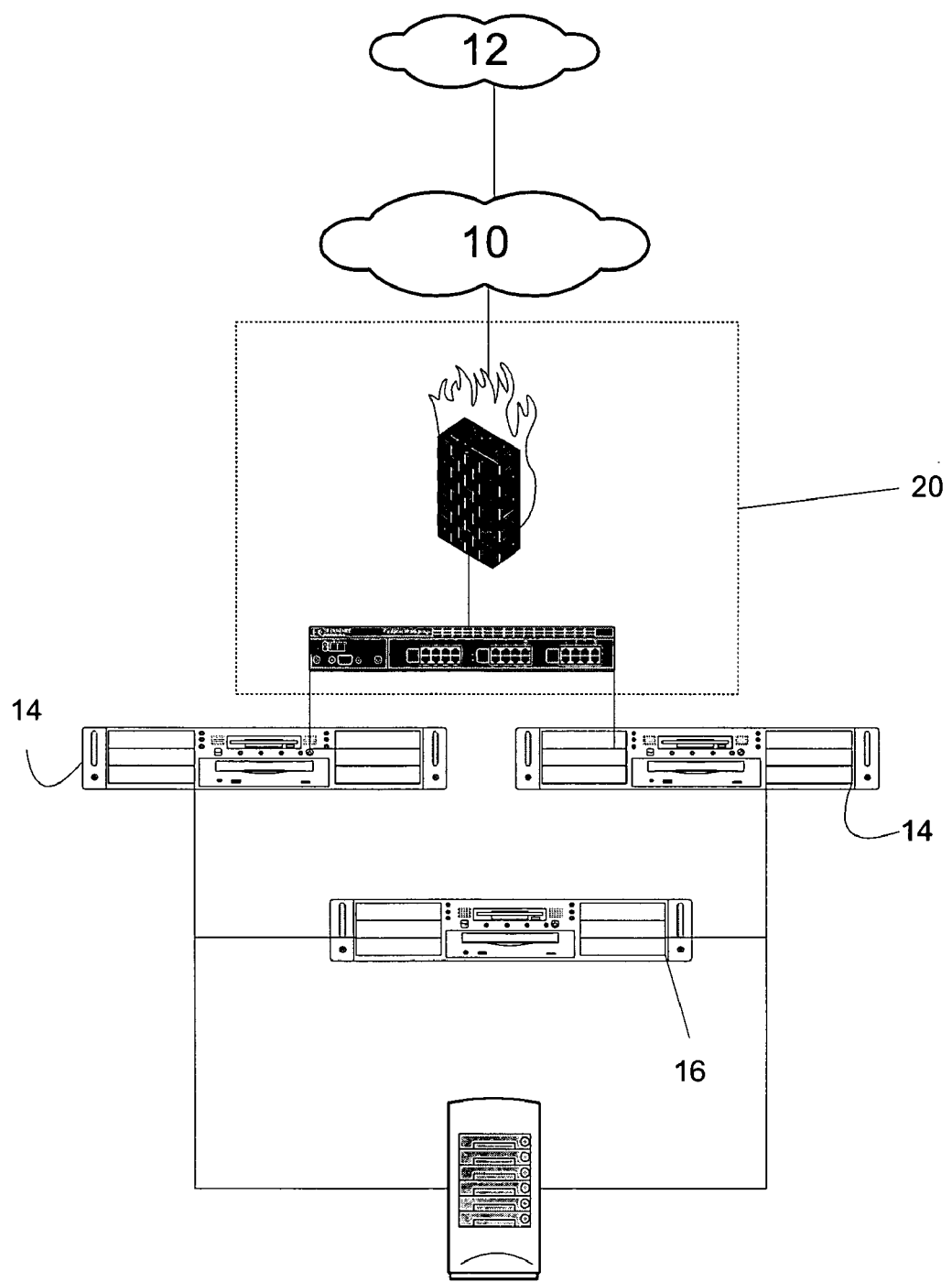
FIG. 8 is a diagram that illustrates a simplified hardware implementation of an embodiment of the invention.

As shown in FIG. 8, an example system embodying the invention is implemented in a system for carrying out electronic trading on the Internet 10. The system executes on a host 16 and is accessed from a web browser executing on a remote client computer 12 communicating with a server 14 using hypertext transfer protocol. Networking apparatus 20, such as a load balancer and a firewall maintain a secure connection between the host 16 and the Internet 10. A user of the remote computer is therefore considered in this description to be a customer of the server's operator, and therefore a user of the system embodying the invention. When the system requires data to be input by the user, it can cause an applet to be executed on the remote system 12, the applet displaying data output and input objects with which the user can interact.

Introduction to the Technology

Figure 1:
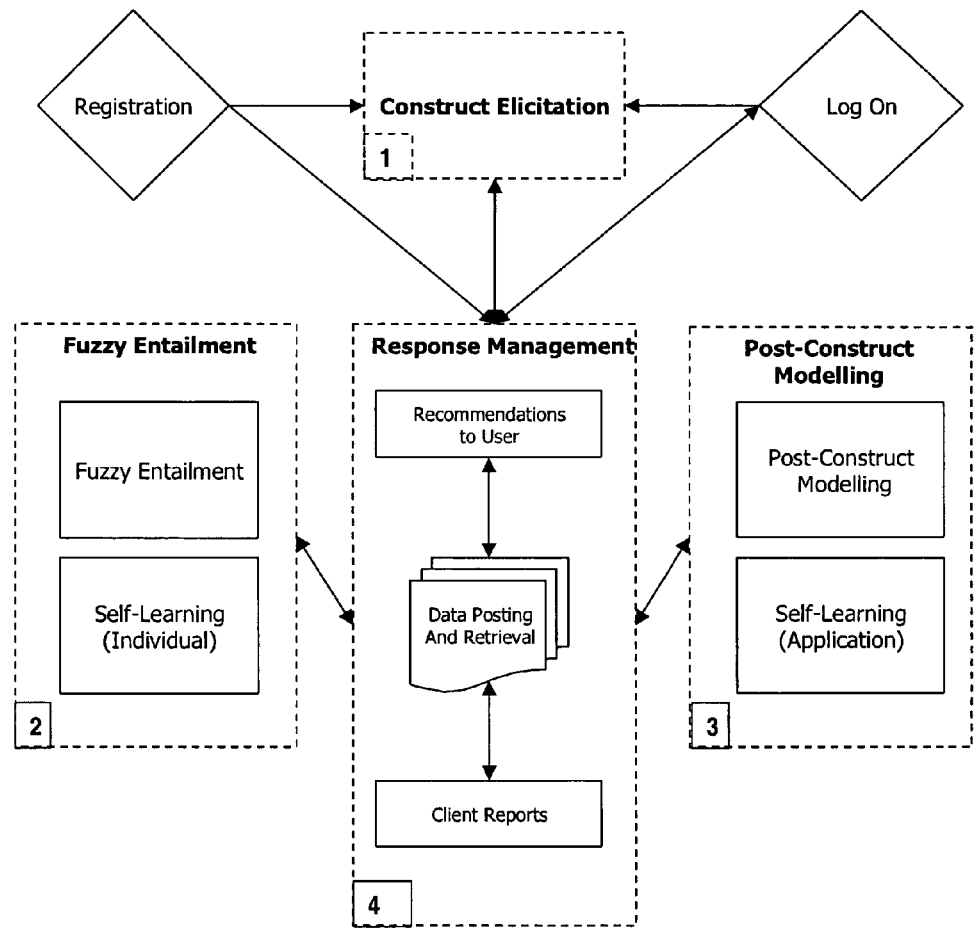
FIG. 1 is a diagram illustrating the overview of a customer management process in an embodiment of the invention.

The technology underlying the invention will now be described in terms of a plurality of method steps performed by an analysis engine, with reference to FIG. 1.

The technique and methods described seek to enable inter-comparison and prediction between and for users of online supply services using fuzzy logical entailment.

Personal Construct Theory

The conceptual basis is that of "repertory grid theory" (RGT). This is often referred to, within the context of the present invention, as "personal construct theory" (PCT). As originally described, and commonly still practised in personal counselling, the analysee selects their own element set, uses these to generate their own personal constructs and generates scores (usually on a numerical range of 1 to 5) for each construct pair against each element.

The process, whilst capable of being made fast and easy for the analysee, is neither intuitive nor easy for most people to do quickly. The constructs generated are rightly called personal constructs and require a degree of introspection which users require time to attain. Because each set of constructs and elements may be different, particularly if the potential element set is large, there are considerable problems, both computationally and semantically, in comparing grids of scores from different analysees. Given that the expected attention span of a typical Web user it is not great, it is not realistic to expect a user to participate in a full PCT procedure. To avoid these issues a strong variant is used for score elicitation in embodiments of the invention.

Instead of an element set generated by the user, the system provides a reference element set provided for the specific domain of interest. A typical example might be the domain "Cookery Books" with the elements as a number of titles of concern to a retailer that have been selected to represent qualities of interest within the exercise and its place in time.

Instead of user-generated construct pairs, a reference set of construct pairs is provided by the embodiment. These are, in the steady state, tuned in response to more detailed interviews with selected users, possibly using more PCT-like techniques onscreen or via the telephone.

These pre-supplied construct pairs (which may be true opposites—which is not necessary or even advisable in traditional PCT) are then used as the basis of a set of scores for the elements by the user. Thus, whilst repertory grid analysis normally requires that the user generates their own set of descriptors for some user or otherwise defined set of elements, user willingness makes this problematic and pre-defined descriptor sets would be used, tuned as required with further user input from selected users.

Construct Elicitation

Personal construct psychology seeks to capture individual perceptions of particular issues and the world in general in order to predict behaviour. With this in mind, repertory grid technique is used to elicit views on chosen products or services or features of either (known as "elements" or "items") using pre-determined or user-generated linguistic pairs (known as "constructs"). The psychology considers that users will express views that pertain to things—and rank their personal perception of those things along a bipolar range A→B, A and B being the linguistic pair.

An Additional Source of Data

As discussed above, PCT is not an easy for a user to complete quickly. Therefore, not all users will complete PCT responses. However, it is most undesirable that data relating to those customers be abandoned since it is potentially useful. Customers who do not complete a PCT response can be included by the system by classifying them to the PCT generated groups using a pattern recognition algorithm. In this embodiment, Fisher Linear Discriminant Analysis (LDA) is a pattern recognition technique that is used to classify new users into known classes based on a flexible number of characteristics, such as demographic data, purchase history parameters and so on. This algorithm allows the pattern recognition to be performed in a computationally inexpensive manner, which is important for the scalability of the system.

Statistical modelling techniques that attempt to relate the importance of various inputs (for example demographic characteristics) to outcomes (e.g., 'customer value' metrics) can be used to adjust the classifiers generated by the LDA, or to adjust the set of characteristics considered by the LDA.

Learning algorithms (such as the perceptron algorithm) can be used to provide incremental adjustments to the classifiers derived from LDA when an increasing number of users complete PCT responses.

Logical Entailment

Logical entailment can be defined as 'a set of premises logically entails a conclusion if and only if every interpretation that satisfies the premises also satisfies the conclusion.' (Michael Genesereth; Stanford 2002). A strict interpretation of logical entailment in the context of this invention would require that a descriptor pair would logically entail another pair if the score set for the first were either the same or consistently greater than or lesser than the second.

Since there are severe data problems inherent in user provided scores due to low volumes of scores and user reluctance the iterative mesh technique, to be described, is used to lower the data granularity so that comparisons can be made at a lower measure resolution.

Fuzzy Entailment (Initial Prediction and Individual Self-Learning)

Rankings are used to determine values for construing on chosen elements. Logical entailment is used to determine semantic relationships and probabilities based on the use of language, and fuzzy logic is employed to filter stronger degrees of entailment according to individual linguistic nuance. The resulting values are a set of entailments between constructs and between elements.

Based on entailment values, constructs will begin to polarise into particular groupings, which in turn will have particular user, and element, attachments. That means that customers and products begin to align to systems of construal in a fluid and dynamic way. Subsequent construct elicitation and fuzzy entailment will update these groupings and attachments so that customers and products may form stronger or weaker associations with particular construal systems over time, reflecting for customers, their own development, thinking and motivations and for products, the emergent and changing associations by the client's customer base.

New product recommendations can usually be fed back to the user in the immediate term as a quick response mechanism.

Grouping Based on Fuzzy Entailment

Users with the same dominant construct, at exactly the same mesh resolution and level, form groups.

This works once a few hundred PCT responses are collected. In the bootstrap period before this is achieved, it is more effective to dynamically group each user with others who have the same dominant construct within some threshold level of magnitude, and ignore the mesh level used to achieve it.

Guidance on the implementation of PCT is given in Appendix A.

Linear Discriminant Function Analysis

As discussed briefly above, this embodiment can classify users who have not completed PCT responses into groups that have been derived from those who have. This classification is done using linear discriminant analysis (LDA). The basis for the classification is a wide and flexible variety of characteristics, from demographic data to purchase histories, Recency/Frequency/Monetary value (RFM) metrics and so on.

LDA considers the characteristics of individuals to be mutually orthogonal vectors, and the aim of the technique is to define hyperplanes that separate classes of individuals. Its main advantage over other classification techniques is that once a linear discriminant function is established it is computationally inexpensive to perform classifications.

A mathematical representation of the analysis is given in Appendix C.

Modularity

LDA a good integrating technology because it is capable of classifying based on an arbitrary number of characteristics. Modules are developed that each contain the logic required to retrieve characteristics. Several standard modules will be developed to extract characteristics from clickstream analysis, demographics and RFM metrics. This modular approach also supports the development of custom modules for client specific sources of characteristics.

Linearisation

An important aspect of the analysis is the linearisation of characteristics. For example, if an input to the analysis is an individual's age, this is already a linear input. However, if the input is, for example, an individual's occupation, this is considerably less trivial to linearise. One approach is to associate occupation with social gradings, these being easier to linearise, or to consider each occupation as being a separate digital characteristic. Separating characteristics like this is likely to have performance penalties in both background and, to a lesser extent, live stages, but may produce better classifications.

Linearisation of PCT Output

Although the initial clustering from the PCT analysis uses a "fuzzification" process to make discrete the construct entailment, for the LDA best resolution is gained by using the original continuous value of the entailment.

Opportunities for Integration

Linear discriminant analysis does not attempt to relate which of the characteristics known about an individual are causative to a particular outcome, nor to provide insight into how similar users might be. As such, it is not capable of self-seeding (clustering), or of tuning itself further. This allows a harmonious integration with the fuzzy entailment technique for clustering users, and with statistical techniques (Probit and Logit analysis, for example, as described below). This is used to determine which characteristics determine which outcomes. Such statistical techniques can be used to tune the LDA function by altering the set of characteristics considered in the function, by including the characteristics found to be important, and excluding the unimportant.

There is also an opportunity to use a learning algorithm to adjust the LDA on the basis of each new user who completes PCT responses (rather than completing a full LDA again, or waiting until you reach a critical batch size).

Post-Construct Modelling (Prediction Analysis and Application Self-Learning)

This stage uses statistical modelling to determine the impact of predictions and recommendations on purchasing behaviour. By analysing the strength of recommendations and the outcomes of activity using this system embodying the invention, the application assesses the degree of influence that recommendations are having on both purchases and purchase amounts. It then extrapolates to determine if marginal effects may improve the rate of convergence from recommendation, to purchase.

The added benefit from this is that marginal effects analysis from recommendations may be used to second-guess the influences and behaviour of those who have not used the system, or who have used the system but received no recommendation following data input. Although repeat users of the system are less and less likely to ever get a 'No Recommendation' assessment, the valuable feature of this mechanism is that the application ensures the inclusion of the widest possible user base which can benefit from its powerful predictive power. This is a powerful feature and one that may be used to promote greater customer coverage and engagement with the system at very low cost to the client.

Response Management

Figure 7:
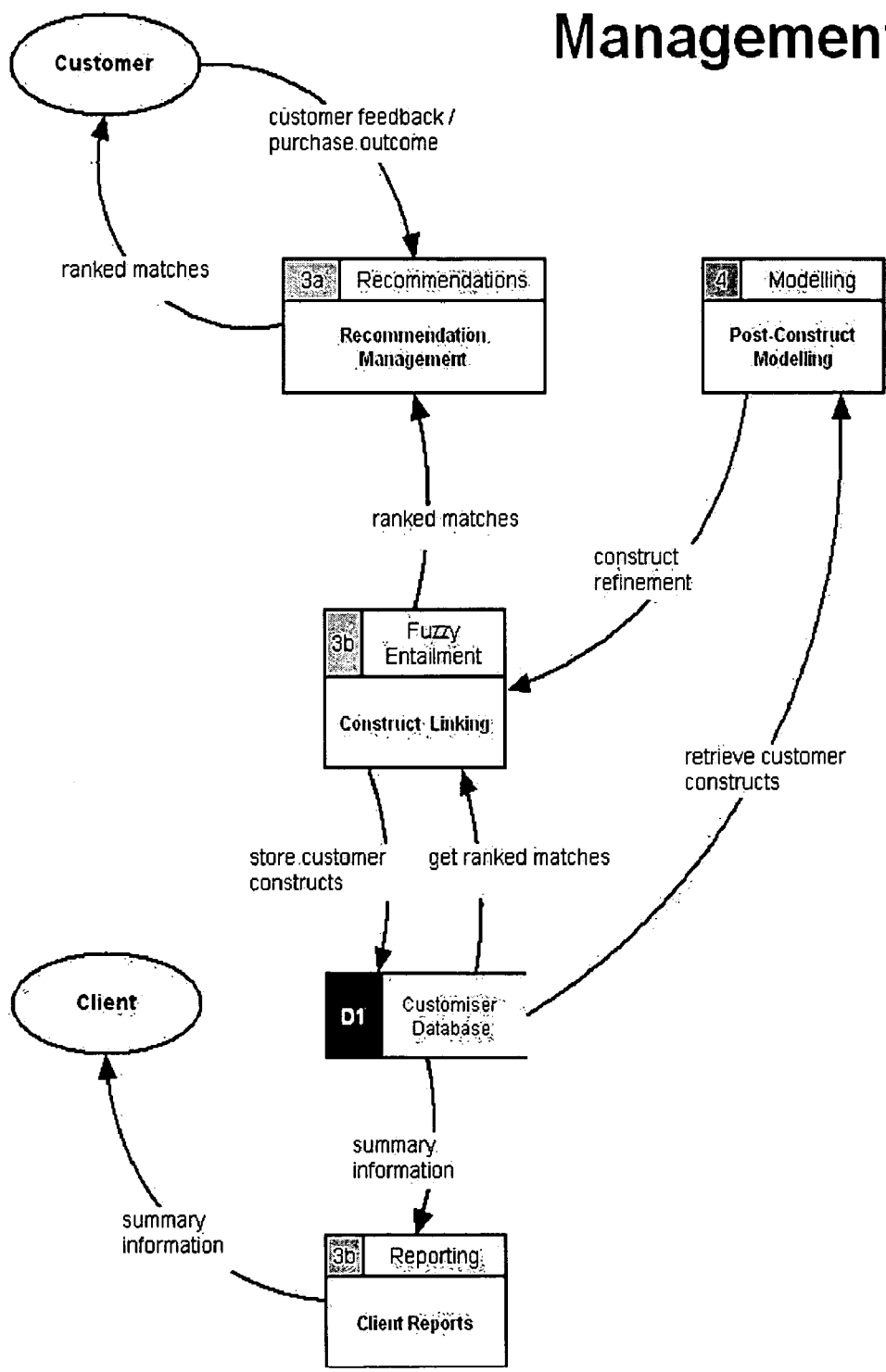
FIG. 7 is a diagram illustrating the response management process in an embodiment of the invention.

Shown in FIG. 7, this stage sends suggestions to the customer regarding products of interest and to the company regarding the status of customers, products, and construal systems in operation among users (how products are perceived). Cumulative values are updated for products, customers and constructs as new data are input to the application. Response management continually updates the presentation of feedback to customers and clients based on this new data and/or internal application self-learning, and handles all aspects of data storage, data retrieval, application coding and reporting.

Configuration Issues

Systems embodying the invention are applicable to many different business situations. The system works basically with customer, product, construct and other 'objects'. Constructs, statistical modelling, recommendations, triggers, thresholds reports etc. are defined only through the use of the software.

There are two basic types of user—the administrator and ordinary user. The administrator exclusively will be able to:
- point to product, order, customer, construct and other databases as required;
- define aliases allowing the use of any legacy system data to be used as required;
- customise look and feel to suit company requirements;
- choose reports;
- delineate client-defined weighting factors where available;
- define triggers for actions (e.g. level above or below which results considered important or actions taken);
- define actions (e.g. trigger-defined results initiate communications).

Linking or Registering Data for the Application

Users, items, purchase histories (orders), and labels (constructs) all need to be recognised by the application. For users, a registration is required which captures basic data. Other demographics are usually available through the client's customer database and can be imported by the system from there. A complete breakdown of data structures and databases of this embodiment is detailed in Appendix B—Data Structures and Databases below.

Customise Look and Feel

The system is set up so that the administrator can enter company details, including HTML stylesheets, a picture field for a logo, and other client-produced templates with which the system can operate. In this way, the system can look and feel like an extension of the company's web site.

Report Selection

The administrator will be able to select from a list those reports to be sent or made and available or notified to relevant people within the client organisation or the customer base, as required. At least two e-mail addresses should be user-definable. Of course, one or both of these could be distribution lists. A minimum choice of report formats—HTML or TEXT—is available by default in this embodiment.

A facility is provided that allows the client to define a text file for export to any client-maintained database.

Defining Triggers and Thresholds for Action

Different companies using the system may wish to define their own trigger levels, above or below which an action is to be taken. For example, a company using the system may wish to receive an alert every time a customer moves into or out of the quintile group of those most likely to be disloyal to the company so that a particular chosen action can be taken.

These triggers and thresholds are usually numeric values that act as filters during the response management stage. The user-definable triggers and thresholds are as presented in the following table:

TABLE 1

Trigger and Threshold Values

| Stage | Trigger or Threshold | Comment/Report Reference |
|---|---|---|
| Fuzzy Entailment Construct Entailment-User Attachment to Groups | Trigger levels defined by client within configuration. | Count of the number of constructs a user has used which also appear in the Strong Construct Group at any point in time, then taking standard confidence levels (80-99% as set by client) above which recommendations are very likely to prompt (purchasing) action.. |
| Fuzzy Entailment Strong Construct Group | % value above which constructs are deemed to be entailed enough at the cumulative level (over many users' input) to constitute a strong grouping. | The difference between these values constitutes the Weak Construct Group |
| Fuzzy Entailment No Construct Grouping | % value below which constructs are not deemed to be entailed enough at the cumulative level (over many users' input) to constitute a grouping. | |
| Fuzzy Entailment Strong Element Group | % value above/below which elements are deemed to be entailed enough at the cumulative level (over many users' input) to constitute a strong grouping. | The difference between these values constitutes the Weak Element Group |
| Fuzzy Entailment No Element Grouping | % value below which elements are not deemed to be entailed enough at the cumulative level (over many users' input) to constitute a grouping. | |
| Fuzzy Entailment Element Entailment-Strong Recommendation | % value above which degree of entailment is high enough to make strong recommendation | Together, these trigger values constitute application's Fuzzy Entailment Recommendation Rule (FERR). The difference between these values constitutes Element Entailment-Weak Recommendation. |
| Fuzzy Entailment Element Entailment-No Recommendation | % value below which degree of entailment is not high enough to make weak recommendation and so no recommendation is made | |
| Post-Construct Modelling RFM Values for Customers | Quintile split of customers according to their RF values (RFM if we can get the Monetary value of recent purchases easily enough) | This is an internally used report that provides individual customer RF values for use in Post-Construct Modelling AND a quintile split of those values ranked in descending order. The result is 5 groupings with which we can work. |
| Post-Construct Modelling Purchase Influence | Degree of Influence above which outcome from recommendation on purchase is 1 = YES | These thresholds will affect the internal analysis of performance. If set low the application |

TABLE 1-continued

Trigger and Threshold Values

| Stage | Trigger or Threshold | Comment/Report Reference |
|---|---|---|
| Post-Construct Modelling Purchase Amount Influence | Degree of Influence above which outcome from recommendation on purchase amount is 1 = YES | will appear to have a greater influence on purchasing decisions, and indicate the need to narrow the search for marginal effects. |
| Response Management Number of Days to Purchase | Trigger value for the number of days after a recommendation is made, beyond which the influence of the recommendation can no longer be seen to be significant | |
| Post-Construct Modelling Marginal Effect Threshold | Value above which a marginal effect is deemed to be significant in influencing purchasing decisions | Default is 80%. |
| Post-Construct Modelling Proximity Coefficient | Value above which a customer who has not received recommendations from the system is deemed sufficiently likely to receive relevant recommendations based on marginal factor proximity to those who have received recommendations. | Default is 80%. |
| Response Management Customers About to Churn | Lowest quintile to be reported in ascending order. | This is the following calculation: RFM value*IMR value*Tobit Value (or Logit or Probit depending on experimentation used) |

Defining Actions

Once triggers have been defined, actions need to be associated with these. The following actions will be available:

select from list of e-mail templates (produced by company)—may be based on trigger type send e-mail of selected template to customer/customer group at e-mail address/distribution list send e-mail of selected template to individual/group at company Select from list of HTML templates to act as user's personalised homepage Select from list of HTML templates to show as company reports provide immediate on-screen feedback of HTML template X, Y, Z (X, Y and Z types will be determined through configuration, and associated content by trigger type and value)

pass data for further processing or storage

Output Formats

The following tables are examples of output from configuration and registration.

TABLE 2

Client (Owner) Registration and Security

Company Name
Company details
WebSite (constant, URL format)
Other company details
Administrator Names
Administrator IDs
Administrator passwords
Administrator passphrases

TABLE 3

Configuration

Users (Customer) Database location + reference + views + aliasing + links
Items (Product) Database location + reference + views + aliasing + links
Order Database location + reference + views + aliasing + links
Labels (Construct) database location + reference + views + links
Userslabels data storage
UsersItemsLabels data storage
UsersLabelsEntailments data storage
UsersItemsEntailments data storage
CumulativeUsersLabelsEntailments data storage
CumulativeUsersItemsEntailments data storage
Recommendations database location + reference + views + links
Trigger/Threshold data storage

TABLE 4

Customer, Product and Order Lookups

ID (link item, name of user, pointer to database record)
Last purchase (Element, product ID, link to order database)
Last purchase amount (Element, product amount, link to order database)
YES/NO if this last purchase is stored as a recommendation to the user
List of customer IDs that have not used the system to date
List of customer IDs where 'No Recommendation' has been returned on last visit to the system RFM refers, in order, to recency (number of days since last visit to site), frequency (number of visits to site in last 30 days), and monetary value of purchases in last 30 days not including this visit. 'Response to recommendations' is a requirement to get feedback on recommendations as they are delivered from the fuzzy entailment stage. Not every system need implement capture of all of these items; indeed most will capture a subset of them, and some systems may capture other data at registration.

TABLE 5

Customer Registration

Demographics (age/gender/occupation/marital status/hobbies etc.)
What happened during the visit (day/time/duration/windows used/other pages visited/page from/page to/other goods recommended or purchased etc.)
RFM information on visitor
Response to the recommendations during this visit (apart from purchase or not) - was the recommendation useful? Has user heard of/bought the element (item/product)?
Purchase(s) amount(s) - individual values in an array of purchases in last 180 days, with flag if result of/linked to recommendation Processes in Detail—Construct Elicitation Process Description Users are referred to the web applet provided by the system from various sources—for example, automated pushed e-mails, direct communication by company, advertising or word of mouth. As described in "CONFIGURATION ISSUES" above, a registration process and data linkage will be required.

This involves creating a web-based user interface that can present and capture data. Regardless of how users arrive at the first screen, the overall function of construct elicitation is to collect data from users (customers) in an interactive and preferably entertaining way about the context of their visit/use of software and the things they wish to offer information about in return for suggestions. Construct and element names, and numerical construct rankings for elements are key outputs from this stage of the system.

For a user, incentives to input data are based on benefits, for example, amongst other possibilities:

Immediate feedback
Client offers reward for taking part—prizes, reward points etc
Interesting process involved
Time saved in reaching concrete and relevant recommendations
Personalised homepage populated only with items of interest
Personalised feedback about their likes
Special offers
Confidential, friendly advice Consideration of the preferences of likely users of a specific implementation will help to ensure that the feedback given is perceived as truly beneficial and worth the 'hassle' of data input.

A general context is asked for at the outset. This clarifies the top-level domain—for example, wine, books, CDs, or whatever product categories the client delineates. Using repertory grid methodology, users complete a triad task to elicit from them how they perceive a group of products or services. From a predefined list of products (known in repertory grid analysis as 'elements'), users choose a minimum of three products and are then asked to select the odd one out. When a choice is made, the user is prompted to enter a word or phrase (known in repertory grid analysis as 'constructs'), which explains why the user perceives that element to be different to the others. For the purposes of this embodiment, a minimum of three elements ranked using three constructs is required.

The opposite pole to the word must also be elicited and is often not straightforward. Consider an example in which the system is to investigate perceptions of books. If a user describes Lord of the Rings as 'heavy' then the opposite might be 'light', but this could mean either actual weight of the book or the type of read it is perceived to be. So, the system must encourage clarity so that the opposite of 'heavy' might be 'easy to carry around' or 'light in weight' or, alternatively, 'short' or 'easy to read'. The point is that different people use language in different ways and to avoid confusion at this early stage a construct repository is configured by the client to help their users clarify the meaning behind constructs. Over time, this can be added to with user-generated constructs.

A radio button or checkbox is used by the customer/user against the construct pole that they see generally as more positive in their mind.

Using the initial construct chosen by the user, the system then gives the user a list of elements (products) in the same product category and asks the user to choose as many as they wish to rank in terms of the construct that they chose. Ranking is carried out by simple slider controls.

The key to the data entry is that it should be simple and quick. The immediate feedback that will follow will be dealt with later.

Embodiments may include a construct repository. If a user types in a new construct, a useful supplement is to have a keyword or linguistic matching procedure to offer the user the ability to choose an existing construct based on what they have typed in. Both poles of the existing construct are shown so that the user can decide if this is the bipolar distinction that he or she was thinking of.

The following is an example of a single construct:

TABLE 6

Basic 1 × 10 Grid

| | Elements | | | | | | | | | | |
|---|---|---|---|---|---|---|---|---|---|---|---|
| | A | B | C | D | E | F | H | I | J | K | |
| Construct Pole X | $R_1$ | $R_2$ | $R_3$ | $R_4$ | $R_5$ | $R_6$ | $R_7$ | $R_8$ | $R_9$ | $R_{10}$ | Construct Pole Y |

$R_1$-$R_{10}$ are the ranks for each element according to the construct given. Less than 10 elements may be chosen, but the minimum requirement is three.

On this simple example grid, elements can be correlated to discover if there are any statistically significant groupings that would indicate that, for this customer, a group of products were perceived similarly in terms of this construct.

Generally, grids are better if there is more than one construct as it is possible to correlate constructs in relation to an element i.e. show that for a particular product, two constructs are suggested as linked. For example, consider the following grid, which looks at a general perception of computer manufacturers:

TABLE 7

Example 2 × 10 Grid

| | Elements | | | | | | | | | | |
|---|---|---|---|---|---|---|---|---|---|---|---|
| | DELL | PANRIX | COMPAQ | TIME | DAN | TOSHIBA | VIGLEN | GATEWAY | ICL | IDEAL | |
| Well Made | $R_1$ | $R_2$ | $R_3$ | $R_4$ | $R_5$ | $R_6$ | $R_7$ | $R_8$ | $R_9$ | $R_{10}$ | Unreliable |
| Made in Britain | $R_{11}$ | $R_{12}$ | $R_{13}$ | $R_{14}$ | $R_{15}$ | $R_{16}$ | $R_{17}$ | $R_{18}$ | $R_{19}$ | $R_{20}$ | Imported |

It may be that a cluster analysis shows a higher order correlation between reliability and imported products for this customer. With more constructs, further correlations may emerge also.

To elicit further constructs the software allows a user to enter up to a maximum of ten (most users will never get near this number). There has to be at least three constructs elicited to meet the requirements for fuzzy entailment. A loop is offered whereby the user is offered the choice to perform the triad task with a different set of elements (this can be a different range of products under a different product category if required). The more that the system can capture data when a user is enthusiastic and motivated (say, by incentives like prizes or other rewards) the more the application can capture at that point. Note that the application works with whatever it is given, and if blank data fields exist, this is taken into account in workings.

The following are examples of outputs from construct elicitation

Context (Domain) (link item, pointer to database record)
ID (link item, name of user, pointer to database record)
Date stamp (variable)
Time stamp begin (variable)
Time stamp end (Variable)
Elements (Product ID, link item, pointer to product database)
Construct (Text string, link item, pointer to construct pair)
Construct owner (Client [done through configuration] OR user-generated)

Data Matrix:
E elements by C constructs (elements and constructs already defined above)
E*C data elements of numeric format 2 decimal places, a 101-point scale which can be expressed as fraction or integer.
Note: the MINIMUM is a 3*3 Matrix Fuzzy Entailment Taking our example from Construct Elicitation, let us say that a 3×3 matrix like the following one has been produced following a single user interaction:

TABLE 8

Rankings from Construct Elicitation

| Elements → ↓↓<br>Construct Pole | Compaq | Dell | Time | Construct Pole |
|---|---|---|---|---|
| Unreliable | 72 | 40 | 32 | Well-made |
| Imported | 50 | 35 | 20 | Made in Britain |
| Value-for-Money | 68 | 42 | 25 | Expensive |

Ranking values are greater if the user slides the 'volume control' slider further to the right of the screen, so that a value of 72 for a particular element is nearer the right hand pole of the construct than the left. A marker indicates if one pole of the construct is more positive to the user than the other.

For fuzzy entailment, a software procedure will inspect the matrix and produce a set of entailment values. The way it does this is as follows:

Say a 3×3 grid is output from Construct Elicitation thus:

TABLE 9

Raw data from Table 3

|  | Element A | Element B | Element C |
|---|---|---|---|
| Construct X | 72 | 40 | 32 |
| Construct Y | 50 | 35 | 20 |
| Construct Z | 68 | 42 | 25 |

If we look at the relationship between constructs in terms of entailment—the extent to which relationships between row X and other rows look to vary in similar ways—over constructs (down the table) and elements (across the table) then we can use a fuzzy entailment algorithm (FEA) to work out such values. This works by looking not only at the entailment among elements and constructs, but also by filtering the inferential values by using fuzzy logic to determine primacy.

So, first taking constructs and how they relate, we would oppose X, Y and Z with themselves to attain the following table:

TABLE 10

C × C Table (example FEA values given)

|  | Construct X | Construct Y | Construct Z |
|---|---|---|---|
| Construct X | 100 | 60 | 45 |
| Construct Y | 60 | 100 | 70 |
| Construct Z | 45 | 70 | 100 |

Using the FEA, we can say that, for example:
There is a relationship between X and Y at about 60% entailment
There is a relationship between X and Z of about 45% entailment
There is a relationship between Z and Y of about 70% entailment Negative values may emerge as direction indicators between constructs.

To look at Elements by rows, we have to turn the table on its diagonal to reverse:

TABLE 11

Table 3 (Flipped on its Diagonal)

| Constructs -> | Construct X | Construct Y | Construct Z |
|---|---|---|---|
| Element A | 72 | 50 | 68 |
| Element B | 40 | 35 | 42 |
| Element C | 32 | 20 | 25 |

We now oppose A, B and C with themselves to attain the following table:

TABLE 12

E*E Table (example FEA values given)

|  | Element A | Element B | Element C |
|---|---|---|---|
| Element A | 100 | 55 | 75 |
| Element B | 55 | 100 | 60 |
| Element C | 75 | 60 | 100 |

Again, using the FEA method, we would arrive at the following example entailment values:
There is a relationship between A and B at about 55% entailment
There is a relationship between A and C of about 75% entailment
There is a relationship between B and C of about 60% entailment On Constructs A construct repository is provided in this embodiment. Many constructs can be assigned to 'contexts' or 'domains' as required. Constructs are the richest source of identification for both users (customers) and elements (products), since they are the 'glue' that binds them.

On Fuzzy Entailment

In order to ameliorate the constraint in deriving much more data about the semantic value of constructs from users directly, logical entailment is used to cross-match and confirm the semantic use of constructs. Fuzzy logic is used to filter from data input the use of linguistic scaling ('very', 'not very', 'quite', 'extremely' etc.), and thereby act as an important qualifier for entailment, ensuring that the significance of entailment receives preliminary validation at this early stage.

In order to form groupings of constructs, entailment values for each user are then processed through a second set of algorithms that allow both constructs and users to be grouped. These groupings are dynamic, in that they change as new data is input by users. Likewise, groupings of elements take place so that those that form stronger bonds with others through the combined element entailment values derived from users' input, can be recommended to users with a degree of confidence that those users will like them/want to buy them.

So, to sum up, the fuzzy entailment stage allows us to do the following:

Store entailment values created for later use;

Look for existing constructs that linguistically and semantically match the words or phrases input by the user as their personal construct(s) (logical entailment);

Apply principles from fuzzy logic to inspect and report the degree to which entailment occurs;

Report immediately to the user strongly entailed elements (product recommendations) indicated by their use of constructs;

Create and maintain dynamic groupings of constructs and elements to which users have an on-going association, which may strengthen or weaken over time depending on individual and total user community input.

Through multiple interactions from a single user, create a cumulative coefficient to represent the relationship between the user and both construct and element groupings, such a coefficient indicating the degree of association at any one point in time between the customers, construct systems and products;

Outputs from Fuzzy Entailment

Thresholds for belonging to a group are set in system configuration so that above/below the threshold it is possible only to say that an element or user belongs or does not belong (however temporary this belonging might be) to a particular super ordinate construal system.

1. Stored fuzzy entailment values for each construct pair and all elements from an individual interaction from the user;
2. Construct groupings based on cumulative (i.e. from all individual interactions to date) entailment values between and among constructs;
3. Degrees of association between and among elements based on construct groupings;
4. Degrees of association between and among users based on construct groupings;
5. Direction of entailment on each of the above values; and
6. Flags against entailment values lower, equal, higher than designated trigger value or recommendation rule set in administrator configuration.

In typical face-to-face clinical sessions where repertory grid technique is used to ladder i.e. explore the "hows and whys" of constructs, users are offered the chance to review their input, reflect on the results and change values associated with correlations based on that reflection. For implementation, users will be allowed to manually overwrite presented simple correlations/regressions using a simple slider scale, should they so wish. A future development of this invention is to allow more profound laddering, should the user wish to gain from a more refined knowledge pool.

The values for entailment are stored, and used to calculate cumulative entailment values over time.

A further development of this application is to allow user-generated constructs to be incorporated into the application. This is quite simple but requires further work on interface and data posting.

Post-Construct Modelling

Evaluation of Construct Elicitation Recommendations

This part of the application has two main objectives. First, it measures the outcomes from construct elicitation (CE) and fuzzy entailment (FE) recommendations and compiles some simple preliminary statistics, which are stored in a database for further analysis. Secondly, it combines the recommendations with demographics and other data available through registration, web statistics and user feedback to calculate the association between the purchase outcome (did the user buy the recommended item or items) and all other explanatory variables available.

Figure 2:
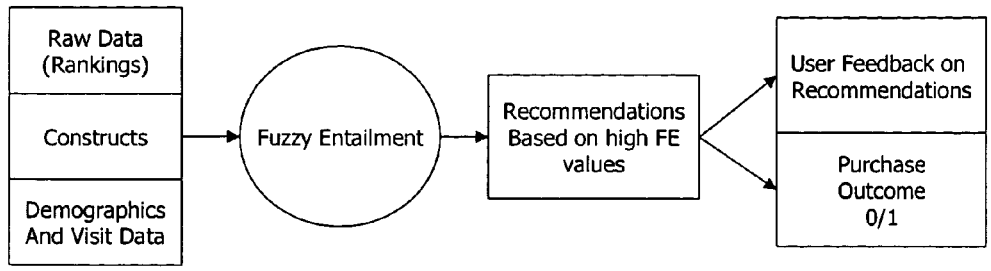
FIG. 2 illustrates the steps following construct elicitation and fuzzy entailment stages.

The steps following construct elicitation and fuzzy entailment stages are shown in FIG. 2.

Recommendations generated through fuzzy entailment, and fed back to the user through response management, will either lead to a purchase or not. When the recommendation is given, the user is asked for feedback, such as: was it useful, have they knowledge of the recommended item, would they like more recommendations (at a weaker entailment level) and so forth. Fuzzy entailment allows ordinal ranking of entailments so that users can be split into those receiving strong or weak recommendations. To evaluate the effect of this 'treatment', a post-construct modelling stage runs a probit where LHS data is recommendations strength (1=strong, 0=weak) and the RHS data consists of all available demographic, site visit and feedback data as outlined previously.

An inverse Mills ratio (IMR) is derived from this probit. A subsequent probit is run that has LHS data being purchased recommendation (1=yes, 0=No) and RHS data being demographics, visit attributes, user feedback responses and the previous IMR. The significance (and sign/direction) of the IMR signifies whether the recommendations made to customers influence purchases and if they are made to the right users visiting the web site.

This framework can be readily extended to incorporate several levels of recommendation strength up to a maximum of, say, 5 if required. In the example used here 100 values produced through fuzzy entailment have been taken, from which 64 have produced some form of recommendation—strong or weak. Those 64 responses are the basis of the data set described in Appendix A below. The system is able as a result of this first stage of post-construct modelling to assess the influence that a recommendation has on:

the decision to purchase or not purchase as a direct consequence of the recommendation being made; and the amount of the purchase made.

At this point we are thus in a position to evaluate the efficacy and accuracy of predictions from fuzzy entailment, and quantify or rank those customers in terms of the degree of influence the recommendation has had on the amount of money that they spend. Self-learning at the application level begins to take shape here, because this internal process effectively derives data which effects checks and balances within the system.

In this embodiment, a minimum of 200 purchases from recommendation is required before the process can begin.

Modelling Marginal Changes

The second step in post-construct modelling for self-learning purposes can take several directions and is dynamic in this respect. At this point we have a view as to the direct impact of some intervention or characteristic of the customer and their indirect impact through recommendation strength. Note that in Step 1 of the Post-Construct Modelling example below, the sample excludes those who received no recommendation, yet the system still has registration and other data available about them.

We can now extend an analysis to those who received no recommendation at all. (Fuzzy entailment cannot guarantee that all visitors will receive at least one recommendation, although over time fuzzy entailment self-learning means that this is less likely for repeat users). The system can predict outcomes by generating recommendations for them based not on their construct elicitation responses but on their demographics. This is not guaranteed, but is a way of picking up those users who have taken the time to use the system and have not generated significantly strong entailment values to have been recommended anything of interest at the fuzzy entailment stage.

Therefore, in effect the system is able to learn from fuzzy entailment, and self-correct to ensure that it can provide a double-check prediction for 'no recommendation' users. If significant marginal effects emerge, the system will attempt to identify customers who have not used the system, but exist within the client's customer database in order to select appropriate recommendations for them too, based on users' proximity coefficients (the degree to which a user is proximal in profile to those who have received recommendations and made purchases and likely to exhibit similar behaviour).

Simulation techniques are used at this point to further enhance self-learning capability at the broader level. A series of predictions are run that give the marginal changes that can be expected if any recorded information at the system's disposal were to change. It is possible to ask at this stage:

How will purchases be affected if threshold values for strong/weak or other categories of recommendation change?

Are there characteristics of weak and strong recommendations that could inform groupings?

What generic user profiles emerge as those most likely to buy following recommendation?

The experimentation possible via simulation at this stage allows us to extrapolate to larger-scale models. The application analyses purchasing behaviour of the new recommendees to accumulate application knowledge about the performance of this marginal recommendation mechanism. Various statistical modelling techniques are available to the application and it will choose which one to use depending on the level of conversion from recommendation to purchase among different customer groups. The aim is to increase purchases among non-users of the system or increase the number of users. If either of these trends is moving upward then the application is improving its performance over time.

A worked example is shown in Appendix B.

The application generates lists of:

1. 'high performance' customers likely to cross-purchase—from results of recommendations combined with demographics to indicate likelihood of high lifetime value (LTV) to the client;
2. 'low performance' customers likely to churn (leave)—from results of recommendations combined with demographics to indicate likelihood of low LTV to the client;
3. customers who have received no recommendations from their use of the system or who have not used the system, but who proximate to profiles of defined high LTV customers above;
4. customers who have received no recommendations from their use of the system or who have not used the system, but who proximate to profiles of defined low LTV customers above;
5. recommendations that went to high LTV customers, for sending to profiled 'marginal' customers;
6. marginal effects statistically influencing purchasing behaviour;
7. recommendations from fuzzy entailment that strongly influence purchasing decisions and amounts.

The following are examples of outputs from post-construct modelling:

For each customer, Value 1=YES, 0=NO: Do recommendations influence whether purchase is made or not;

For each customer, Value 1=YES, 0=NO: Do recommendations influence the amount of purchase or not;

For each customer, Value 0-1: Degree to which recommendations influence whether purchase is made or not;

For each customer, Value 0-1: Degree to which recommendations influence amount of purchase;

For each customer, list of marginal factors that significantly (see "defining triggers and thresholds for action") influence strength of recommendation, purchase decision and purchase amount;

Filtered, ranked list of customer IDs for whom recommendations do influence purchase decision to a strong degree (see "Defining triggers and thresholds for action) AND do influence purchase amount to a strong degree;

Filtered, ranked list of customer IDs for whom recommendations do influence purchase decisions to a weak degree AND do influence purchase amounts to a weak degree;

Filtered ranked list of customer IDs for whom recommendations do not influence purchase decision AND do not influence purchase amount;

Coefficient for each user indicating degree of correlation between demographics, registration data, website visit statistics, and user feedback to recommendations to strength of recommendations themselves;

Coefficient for each user indicating degree of correlation between demographics, registration data, website visit statistics, user feedback to recommendations etc. to purchase decision and purchase amounts;

List of high value co-efficient users/customers for whom correlative values indicate that, even though they have not received recommendations through the system, can receive the suggestions that others have received who have used the system (in effect these will be the people who benefit from this stage of the process but who may not have benefited through Fuzzy Entailment).

Profiling is achieved through the concatenated array values for the above, equally weighted. For example, 1, 1, 0.42, 0.65, 0,0,1,1,0, 1, 0.72, 0.67, 0.45, 0.613. Note that the last figure is the average of the penultimate three coefficients. The underlined figures represent five marginal factors with 1="influences" and 0="does not influence". The unweighted total of this array is the sum of the individual integers. In further embodiments of the invention, weightings may well become necessary, at which point this will become a feature of configuration i.e. each index value defined above will be multiplied by a 0-100 weighting value.

Groupings at this broader level are restricted to quintiles, with concatenated values providing a measure not only of the influence of fuzzy entailment recommendations on purchasing but also of the influence of marginal effects. The upper quintiles represent customers to whom 'mirror' recommendations can be made based on the recommendations targeted at users of the system with similar profiles.

The list of significant marginal customers is available as a report to the client, and to the system, which can then track any subsequent usage of the system. (An advantage of the system is that, through this extrapolation technique, it can attract those who have not used it directly.)

Performance management is achieved through self-adjustment. This is done by keeping dynamic listings of high, and low, LTV clients within the system database (including link IDs to the customer database marginals). Customers that fall within upper quintiles act as models against which others are compared, thereby creating an on-going and self-learning performance regime in which the characteristics and construal systems associated with strong or weak bonds, purchasing or non-purchasing, amounts of purchase and marginal effects on purchasing are constantly acting as referencing tools.

Where recommendations are repeatedly failing to lead to purchase decisions, or perhaps low purchase amounts, the application forces an increment in accuracy so that thresholds for action become higher to improve the level of confidence with which recommendations are given. This can be overridden within the options for configuration. Where recommendations are strongly influencing purchase decisions, the opposite happens, so that the threshold for action on the promotion of a specific product or item reduces to cover a broader range of customers.

While the application self-adjusts with accumulation of data and knowledge, clients may wish to take advantage of the reporting mechanisms available in order to keep abreast of such dynamic performance measurements. In essence the data and statistical values generated are utilised to form 'cumulative intelligence' on customers and products, which can be harnessed by the client for key aspects of the business.

Response Management

Cumulative Intelligence

From this data, the system can be used to show (among other things):
  anticipated general customer reaction to a product or product range;
  dynamic customer groupings;
  prediction of customers that may switch to another supplier; and
  easy-to-read 'predictive' league tables of products and product ranges.

Process Description

At the point of entry to this stage of the system we have all the previous data plus the results of the statistical modelling:
  Updated cumulative entailment values for all elements in range;
  Updated cumulative entailment values for all constructs elicited;
  Group associations based on these entailments;
  Calculated IMR values (degree of influence of recommendations); and
  Calculated tobit values leading to predictions on marginal effects of collected data (attributes other than entailment values impacting significantly on purchasing decisions).

Response management is used following each stage of analysis. Following fuzzy entailment, users receive a set of recommendations based on their input. This is a quick response mechanism and is the primary source of value for the user. The quick response can, however, be presented to the user in several ways. An HTML page carrying suggestions for items of interest will appear immediately after data input has been completed. For users who use the system more than once, we will offer the opportunity for them to have a personalised web page that acts like their. own 'store'. This will not exclude any news, offers, promotions and client-defined requirements, but will contain a unique set of items of interest depending on the individual. Unique because these recommendations will be updated as new data from other users, predictions, evaluation and marginal-effect modelling all act to update cumulative entailment values, group associations, influence factors and both user and product rankings relative to others.

Once a series of predictive indices has been produced for products, product groups, customers and customer groups, the next stage in the process involves:

Look up the TRIGGER or THRESHOLD value(s) for entailment, group associations and degree of influence and marginal effect, and return values depending on whether they equal, surpass or fail to reach that value:
  Posting data to relevant locations
  Updating existing data where necessary
  Using logical conditions (IF, THEN etc.) to determine actions
  Providing INSTANT feedback to the user
  Providing REPORTS
  Executing internal self-checks and balances
  Executing actions based on given parameters configured by administrator The logical conditions for action are most typically a mix of pre-determined statements and user-defined triggers/thresholds and decision models.

A pre-determined statement might be "IF element x is entailed with element y at greater than 0.7 THEN classify as a significant pairing". In this example, the fact that the pairing is nominated might be because this is a fundamental principle of statistical modelling and should not be modifiable by the end user 'administrator'.

A user-defined trigger or decision might be "ONLY show customers significant pairing elements that have an entailment value within 70%±5%". This allows the client to fine-tune the accuracy of the predictors.

Finally in this section is the important subject of reporting. For users of the system, reports split into:
  Those for customers; and
  Those for client/company (software licensee)

In addition, there may be maintenance and technical reports provided in order to aid troubleshooting should any problems arise.

Recommendation from Fuzzy Entailment

This works at two different stages of the application's cycle. First, after fuzzy entailment has produced strong or weak entailments between and among constructs and elements, recommendations are fed back according to groupings formed through this stage. A simple set of recommendations might arise as will be described with reference to FIG. 3.

Figure 3:
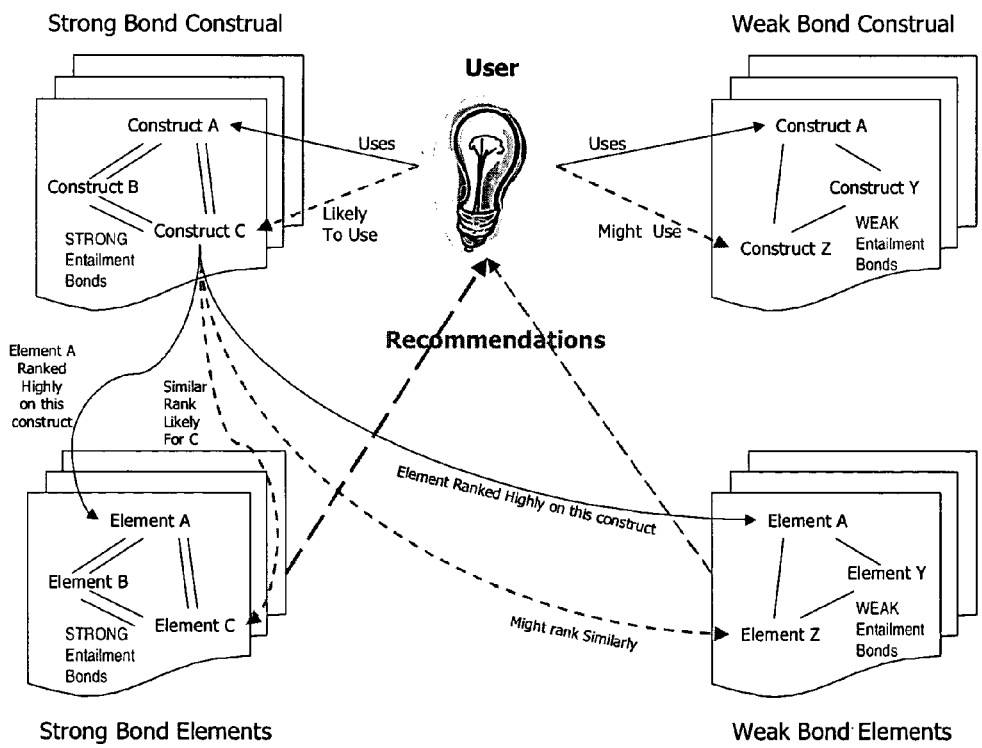
FIG. 3 illustrates recommendations derived from fuzzy entailment.

FIG. 3 above shows how a customer using construct A can be recommended elements A and C based on the strong entailment between construct A and construct C, even if construct A has not been used to rank elements A or C.

Looking at construct A and element A in the diagram above it is worth noting that both constructs and elements have differing degrees of entailment among themselves, so membership of groupings is not exclusive, and as values change with cumulative and longitudinal data gathering, these groupings will be dynamic in nature. This allows the possibility of suggesting new items (elements) to users even though they have not engaged with the system to enter any new data. Although this tends to assume that the user's construct system has not changed in the intervening period, this may be more true in an Internet environment where relatively short customer lifetime values are common and therefore less time exists within which to have major changes of super ordinate construct systems.

Recommendations at this stage represent both an immediate response to users engaged in data input and an ongoing dynamic recalculation of cumulative entailment values between and among constructs and elements which leads to triggering of new recommendations by e-mail, HTML homepage updates or even via alerts to mobile devices.

Recommendation from Post-Construct Modelling

Recommendation at this stage involves assessment of the degree of influence on purchasing behaviour among the population of users of the system receiving strong recommendations, and to analyse customer profiles in this group to assess the possibility of making new recommendations to those who have not used the system and those who have received no recommendations, based on the combination of the effects of recommendations and of demographics, feedback, RF values and web activity. The format of the recommendation presentation will differ from that of fuzzy entailment in that these customers listed by Kostas may not know about the system and require some explanation of why they have received recommendations. Clearly, one of the objectives here is to help engage customers as much as possible in the usefulness of personalisation and the system in particular so this mechanism is used as a 'recruitment drive' for new users of the system.

Report Possibilities

Individual and cumulative predictive coefficients for customers, products, customer groups, and product groups may change as new data is entered, yet at any one point the client can see a snapshot of a series of probabilities, as follows:

For the customer:

Report Type A: General, Individual Customer Ranking

The overall likelihood that a particular customer will be loyal and show an interest in existing or new products Either:

This is the top-level performance indicator and relates to existing customers only. It is a calculation of purchases made following recommendations, RFM values and responses to recommendations. It takes the form of a league table, with only those customers with very low values shown. At a very basic level this is the AVERAGE value 0-1 of:

0-1 value: number of purchases/number of recommendations
0-1 value: RFM calculation
0-1 value: number of times the user has responded positively to the question 'is this recommendation useful'/number of responses made to recommendations;
User-defined weighting factor.

Or:

The average of the cumulative entailment values for ALL elements looked at and ALL constructs elicited for a particular customer;
Proximity to the upper quintile of the normal distribution of these values across all customers (where the customer sits relative to other customers);
a reliability or 'performance' factor based on post-construct modelling; and
a user-defined value or weighting factor, set up by the administrator or imported as part of the initial configuration, which may act as a simple ranking measure of an existing customers status with the company (useful if a company wishes to add their own factors based on their specialised knowledge of the customer, or use a value from an existing customer database such as ranking scores).

Report Type B: Dynamic Customer Groups

Customer Groupings based on different customers' construct systems

This is a measure of the degree of association between users in terms of multiple characteristics:

Degree of association to strong, or weak construct systems
Degree of match between customers with similar values for the influence of recommendations on their purchasing behaviour;
Degree of match between customers with similar marginal effect ratings i.e. those that differ due to similar marginal effects such as particular demographics or responses to feedback questions;
Existing degree of match through client customer rankings/'client'-defined weightings For Products:

Report Type C: Individualised Customer 'Stores'

New products that will interest a particular customer

This is similar to the fuzzy entailment process but extrapolates to all product groupings that may be of interest to a particular individual based on cumulative entailment values:

for a selected customer, all the elements and element groups which are calculated through the application to be of interest at the point of running the report;
Option to save a specific report for a specific customer for tracking over time;
of all those elements returned, a ranked list by cumulative entailment values of item (element) names categorised into strong and weak recommendations;
A flag against each element already owned/bought by the customer.

Report Type D: Actual Product Performance

New products that will interest customer groupings

Same as above, except that each customer grouping is used instead of a particular customer, and the report shows a ranked list of products in terms of:

the number of different groups that the element has been recommended to at a median level of 'strong recommendation';
the absolute number of customers to whom the elements have been averaged as strong recommendations; and
The current ranking of that product according to client-defined characteristics.

Report Type E: Predicted Product Performance

Product performance predictions across the customer base

This can be used where the client wishes to describe and show a new product/item to customers invited to use the system or already using the system, and use entailment and groupings to see which groups of customers are likely to wish to buy it. The list of known customers can then be targeted in a cost-efficient way.

This is a league table that shows elements ranked according to:

The degree to which they have been bought as a result of recommendation;
The degree to which they associate through entailment groupings;

The number of customers to which these elements, though entailment and post-construct modelling, are likely to be recommended.

The system must provide a cut-off point for showing the table, perhaps again on the basis of a trigger values. In the configuration of the software, two values should be input for this kind of report—top n and bottom n elements where n is a user-defined value for the number of elements to be shown in the table.

Customer Reports

Customer Reports are likely to be in the form of HTML pages with highlighted items of interest, information and latest feedback on their input to the system, as well as e-mail templates with special offers etc., based on triggers.

Company Reports

Here it is difficult as there is likely to be a pre-determined subset of report 'templates' that are modified according to user-defined triggers and decision models. On the basis of such reports, automated and manual actions may be taken. Reports will be split into the following categories:

Activity profiling
  Levels of activity on the web application
Product profiling
  These reports will concentrate on league tables of product ranges with the ability to drill down to individual products
Customer profiling
  These reports will concentrate on league tables of customer groupings with the potential to drill down to individual customers if required.
Self-Learning Reports
  Performance monitoring over time to see how well the application is performing in this aspect.
Technical Reports
  These will include error logging, configuration summaries (how the user has defined the triggers and decision models for the system) and other technical reports that may help in the maintenance and upgrading of the software.

For automated actions, e-mail and HTML templates would seem the most efficient way of handling 'push' communications. This aspect of the system is important as it automates not only the process of market research but also directly links promotion to accumulated intelligence that anticipates future customer behaviour and product perception.

Implementation of Fuzzy Entailment Analysis

The object is to gather measures of the user's construct structures in comparison to pre-defined constructs so as to identify a set of users to which the user belongs.

Considerable emphasis has been placed on the difficulties involved in comparing different users' construct sets and scores. Given the basis of PCT, as described above, they are not strictly comparable, since there is no guarantee that the constructs are being interpreted and used in the same way by different users. Accordingly, and accepting that this involves a departure from traditional PCT techniques, in implementing the invention a choice has been made to pre-select the construct sets, these being deliberately chosen on the basis of trials to reflect the market segmentation which is to be examined; and to offer both pre-selected or user-selected elements so as to both minimise the time required for the exercise and to ease the comparison difficulties.

The element set and construct pairs (or singletons) are represented onscreen in such a way that the user can easily and quickly set the 'scores' that they apply to each construct. Scores are indicated by a user placing a marker somewhere on an arbitrary length measure with a descriptor attached to each end of the measure. A typical way of doing this would be for a slider to be moved using a computer mouse or similar pointing device into the desired position on a progress bar, the bar being labelled at each end with one of the descriptors comprising the pair. Typically, the slider would be invisible until the mouse was above the progress bar to prevent the user being biased by observation of the initial, default position of the slider. A mouse event would confirm the scores.

The user is required to provide a mark on the bar representing their opinion (given the construct pair) of an exposed element. Traditionally in PCT, both the elements and the constructs would be generated by the user, but in embodiments of the invention, the implementer can elect to pre-provide both so as to enable the comparisons which will be made with the scores provided; and accepting that the advantages of cohort grouping and comparison outweigh the particular detail provided by individualised sessions.

The arbitrary length progress bar is scaled to provide an initial so-called "mesh" from which the user's score(s) are read. Traditional PCT tends to use scales limited to a fixed range, for example a range of 1 to 5. This range of scores means that the mesh involved has the value 4, which is the largest difference in scores possible between two user inputs. The measure is coded to produce a defined prime mesh. This can be any mesh greater than 1 and up to any upper value required. Meshes greater than 10 do not add significant information and a typical initial upper limit might be 9. Scores are equivalently scaled to represent the score within the mesh as on the user's measure.

The approach taken in embodiments of this invention is not to proscribe the scale in that way. For example, it may be assumed initially that the scale used is 1 to n—classified here as having a mesh of n units (again arbitrary). Practicalities suggest that an initial mesh of 9 (scores of 1 to 10) provides ample detail but there is no need to limit the mesh in that way. For instance, it might arbitrarily be set at 99 (1-100).

It is worth noting that the mesh values described, unlike the example given for PCT, are all odd. Were an even-valued mesh to be used, a mid-point would be produced. Generally, it is preferred that users were not allowed to avoid giving a score by sheltering under the mid point. This is of greater importance as the mesh decreases, since the crudest mesh (that is, a value of 1) can providing a truth table of comparative scores.

Analysis proceeds by setting the initial mesh high and seeking entailments between the descriptor pairs for the supplied scores. As the mesh is lowered, the precision of the measure decreases, but its comparative value increases. This is typical of rendering the data fuzzy, which is the result of the lowering mesh value, and is an important underpinning of the technique described. At each chosen mesh value, logical entailment is sought between descriptor (pairs).

The mesh is reducible to 1 as a lower limit. At this minimal level, the data set of scores against descriptor pairs is reduced to a binary value, such as "Yes" or "No" for each descriptor, allowing their representation in the form of a truth table and thence direct semantic reasoning. Entailments emerging would be of the kind having values designated "entails" and "does not entail", which are directly useful for data segmentation.

For all other mesh values there is the possibility of a degree of entailment. Since entailments could emerge by chance, the fuzzy degree of entailment is used to express the power of the relationship. This can be scaled from −1 to 1, allowing for the positive and negative agglomeration function values described below. In embodiments of the invention, typical semantic pairs are conditioned by linguistic modifiers rather than the traditional 0 to 1 for fuzzy logic.

The user is invited to provide several scores of the same construct sets against a number of elements. Again in PCT there is a tendency to expect score matrices of R constructs against C elements where R and C are expected to exceed 5. In that case the user is required to provide in excess of 25 scores (R*C) and the time investment exceeds the expected time that users will provide for such an exercise online.

Where a level of entailment is considered reportable, the entailment relationship and mesh (ER & M) are stored and compared against other ER & M values generated by other users using the same descriptor set. Since the element and descriptor sets are the same, whilst this is not in accord with traditional RGT due its impersonal nature, the reference sets are selected so as to be both generic and pertinent to the domain of interest, enabling direct comparison both with other such values within the same domain and with such values in conceptually related domains using the same reference set of constructs.

Scores Matrix

Assume a set of scores of three construct pairs (or single descriptors); $R_1$, $R_2$ and $R_3$; against three elements $C_1$, $C_2$ and $C_3$; chosen either by the user or pre-supplied by the system. This is represented in the 3 by 3 case as:

| Scores | $C_1$ | $C_2$ | $C_3$ |
|---|---|---|---|
| $R_1$ | r1c1 | r1c2 | r1c3 |
| $R_2$ | r2c1 | r2c2 | r2c3 |
| $R_3$ | r3c1 | r3c2 | r3c3 |

More generally the scores matrix can be expressed as Scores[R, C] with R rows and C columns.

Processing Algorithm (Agglomeration Function)

A descriptive algorithm for the calculated components of the measures will be presented below.

```
For R_0 := 1 to R - 1
   For R_1 := 2 to R
      NegTotal := 0;        // Sums the number of -ve differences
      NegDistance := 0;     // Sums the fn(S(-ve differences))
      PosTotal := 0;        // Sums the number of +ve differences
      PosDistance := 0;        // Sums the fn(S(+ve differences))
      SameTotal := 0;       // Sums the number where the same
      SameDistance := 0;    // Sums the sames, S =0 (strictly)
      For C_0 := 1 to C - 1
         If Scores [R_0, C_0]<Scores[R_1, C_0]
            NegTotal := NegTotal + 1;
            NegDistance := NegDistance+
               f_n(Scores[R_0,C_0]~Scores[R_1, C_0]);
         Else If Scores [R0,C0]>Scores[R1, C0]
            PosTotal := PosTotal+1;
            PosDistance := PosDistance+
               f_n(Scores[R_0,C_0]~Scores[R_1, C_0]);
         Else
            SameTotal := SameTotal +1;
            SameDistance := SameDistance + 0// (strictly)
      Next C_0
   Next R_1
Next R_0
```

The function $f_n$ is a distance function which, in the simplest case, is simply the difference between the two values.

A typical statistical approach is to consider a distance function comprising the squares of these difference; (other power can also be used). The use of powers of 2 is well-analysed and understood in the context of best linear unbiased estimators (BLUE), but that is not to say that the techniques described herein are necessarily BLUE or satisfy any other standard statistical estimation requirements. In embodying the invention, more concern is given to practical, trial-based estimators for threshold values, as will be described.

The specific distance function used will be tuned within a specific context in practice by simple experiment. Whilst linear differences are easy to implement, advantages given by some power greater than 1 can provide more definite results when the comparison curves are considered. It is expected that some power in the range of 1 to 2 will be used in most practical embodiments.

Specifically, where there are 3 rows and 3 columns of user generated scores, we start off with a 3×3 matrix. Following application of the transforms described above, three vectors are produced, each containing the 3 values:

Measure$_+[S_{12}, S_{13}, S_{23}]_M$

Measure$_-[S_{12}, S_{13}, S_{23}]_M$ where Measure$_+$, Measure$_-$ or Measure$_0$ represents the +ve, −ve or same measures; $S_{12}$ represents the measure produced by the transform of the relationship between the first and second constructs subject to a specified mesh M and using a specified power in the distance function.

The measures are generated successively for decrementing values of mesh until (or, indeed, if) a dominant measure emerges. The task is to seek the largest value, subject to exceeding a threshold, in the three rows of measures above. If no dominance is observed at any level of mesh down to 1 then the only thing we can say is that we cannot say anything—the search has been inconclusive.

For any $[R_m, R_n]$ pair we would have the following measures—

Neg: NegTotal;

Pos: PosTotal,

Same: SameTotal [derived as 0 since no degrees of freedom]

For each measure, the number of scores subsumed within that measure can take a value between 0 and the number of elements less 1.

We represent the number's value possibility as: 0~number~ (C-1), and its distance value possibility as: 0~Sum(diff)~((C-1)* (mesh-1))

The following can then be inferred:

| So: | Mean | $\Sigma d^2$ | $\Sigma d^i$ |
|---|---|---|---|
| N | 0~(M − 1) | 0~(M − 1)$^2$ | 0~(M − 1)$^1$ |
| P | 0~(M − 1) | 0~(M − 1)$^2$ | 0~(M − 1)$^1$ |
| S | 0~(M − 1) | 0~(M − 1)$^2$ | 0~(M − 1)$^1$ |

Measures would be scaled using these upper and lower bounds to lie within the absolute range 0~1.

We get the following 3 vectors:

| | |
|---|---|
| Neg | [n12, n13, n23] |
| Pos | [n12, n13, n23] |
| Same | [n12, n13, n23] |

In practice the measures above will have predictable upper and lower absolute values in that the largest value that any of the measures above can take is:

$(mesh-1)^{Power}.(C-1)$.

The smallest value is 0.

The system then operates to calculate a modified form of entailment, which will be referred to as "dominance".

The mesh is progressively reduced until either (a) it finds a relationship which meets the threshold value or (b) the limiting mesh value of 1 is reached. This will generally involve seeking the largest score amongst those presented by the agglomeration function. If no dominant measure emerges at a given level of mesh, the mesh value is reduced, ultimately to 1. Dominance is re-examined at each iteration.

Output

Figure 5:
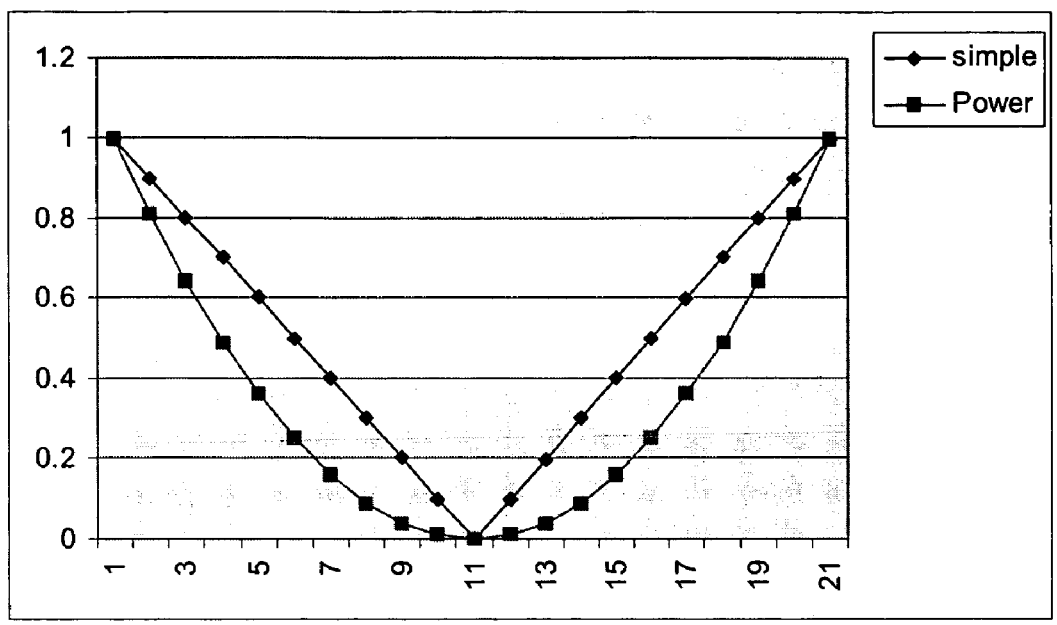
FIG. 5 is a graph that illustrates the relationship between the output of a fuzzy entailment function for a range of power and mesh values.
Figure 6:
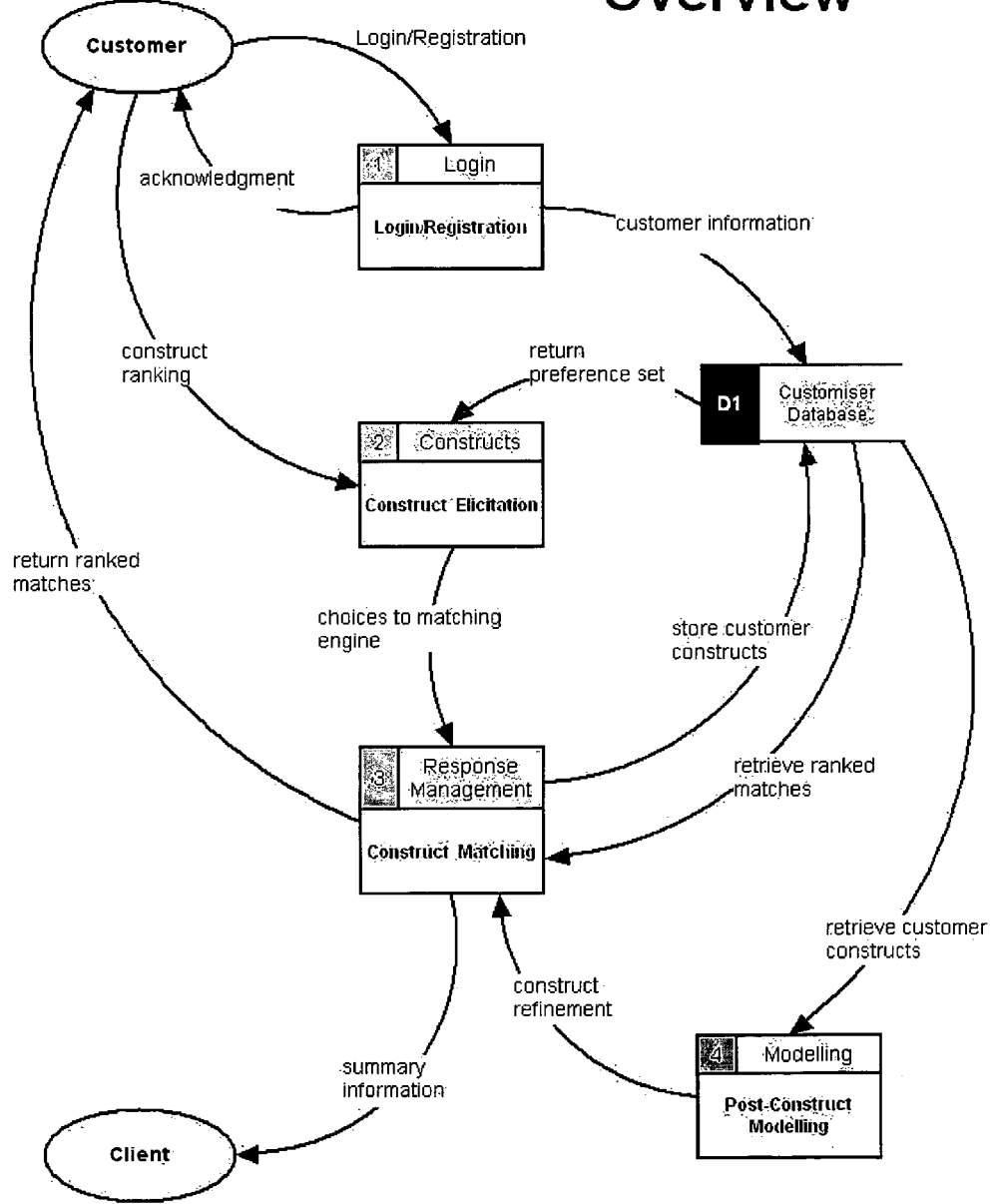
FIG. 6 is a diagram that illustrates the interactions between a user and various components of an embodiment of the invention.

The output of the analysis performed is a determined "fuzzy measure" (either negative or positive since same relationships are sterile), with a value and a mesh. This will be used to make comparisons with other ER&M sets generated by other users. Decreasing mesh reduces apparent accuracy whilst increasing meaning. This is described with reference to FIG. 5.

Transforming Fuzzily

If a simple distance function (Power=2) is used, compared with a linear distance function, the following benefit arises: the use of the power function depresses more the values that are nearer the region of lesser interest (close to 0), and depresses less as towards higher values. The tuning requirement is to estimate practical values on the vertical axis such that we ignore 'relationships' with a value lower than the threshold, e.g. 0.8 in this case. Hedges are the fuzzy logic equivalent of confidence intervals, but the sample size and the nature of the technique posit that they are different in meaning.

Algorithms

To make clear the nature of the algorithms that are used to calculate the relationship values, the following are Pascal code segments that are example implementations of the algorithms.

```
function Entail(Mesh, Elements, Constructs: Integer; Score: string) : string;
var
    lb, ub:       Integer; //Derived from the Mesh - only ub needs to be defined if lb always =1
    MaxDiff:      Integer;
    SumRow:       Integer;
    Element:      Integer;
    SumRows:      string;
    SumRow2:      string;
    SumRow3:      string;
    SumRow4:      string;
    SumRow5:      string;
    SumRowPair:   Integer;
    SumOfDiffs:   Integer;
    HomogN:       Integer;
    HomogO:       Integer;
    HomogP:       Integer;
    i, j:         Integer;
    Current:      Integer;
    NextIs:       Integer;
    NowRowStr:    string;
    ElementStr:   TStrings;
    First, Second: Integer;
    FuzzyFirst:   Integer;
    FuzzySecond:  Integer;
    NPro:         Real;
    OPro:         Real;
```

-continued

```
    PPro:         Real;
begin
    lb := 1;
    ub := 10; // Mesh value 9
    MaxDiff := (ub - lb) * Constructs;
    SumRow := 0;
    SumRows := '';
    ElementStr := TStringList.Create;
    for Current := 1 to Constructs do begin
        NowRowStr := Copy(Score, (Current - 1) * (3 * Constructs) + 1, Constructs * 3);
        ElementStr.Add(NowRowStr);
        SumRow := RowSum(Elements, NowRowStr);
        SumRows := SumRows + Copy('0' + IntToStr(SumRow), Length(IntToStr(SumRow)), 2);
    end;
    for Current := 1 to Constructs - 1 do begin
        SumRowPair := 0;
        SumOfDiffs := 0;
        for NextIs := (Current + 1) to Constructs do begin
            SumRowPair := StrToInt(Copy(SumRows, (Current - 1) * 2 - 1, 2))
            +
            StrToInt(Copy(SumRows, (NextIs - 1) * 2 - 1, 2));
            for Element := 1 to Elements do begin
                First := StrToInt(Copy(ElementStr[Current], (Element - 1) * 3 - 1, 3));
                Second := StrToInt(Copy(ElementStr[NextIs], (Element - 1) * 3 - 1, 3));
                SumOfDiffs := SumOfDiffs + First - Second;
                // Homogeneity measures
                FuzzyFirst := Fuzzify(Mesh, First);
                FuzzySecond := Fuzzify(Mesh, Second);
                if FuzzySecond < FuzzySecond then
                    Inc(HomogN)
                else if FuzzySecond = FuzzySecond then
                    Inc(HomogO)
                else if FuzzySecond > FuzzySecond then
                    Inc(HomogP);
            end;
            NPro := HomogN / Constructs; // REAL
            OPro := HomogO / Constructs;
            PPro := HomogP / Constructs;
            //
        end;
    end;
    ElementStr.Free;
end;
function Fuzzify(Mesh, TheScore: Integer): integer;
begin
//result := TheScore;
    TheScore := StrToInt(FormatFloat('#0', TheScore * (Mesh / 100)));
    if (TheScore < ((Mesh + 1) / 2)) then
        result := -1
    else if (TheScore > ((Mesh + 1) / 2)) then
        result := 1
    else
        result := 0;
end;
```

Appendix A—Post-Construct Modelling Example

This appendix describes a very simple version of the post-construct elicitation (CE) and fuzzy entailment (FE) econometric work which augments these stages through adding group-level and application-level learning by evaluating and updating recommendations procedures, experimenting with marginal effect influences, and producing from that inferences which can cover the entire customer base.

This part of the software engages after CE/FE stages have produced over 200 responses and purchases. As it is based on classical statistical methods and uses Maximum Likelihood techniques, its accuracy depends on larger numbers. In this sense it complements perfectly the predictive capabilities and self-learning at the individual level.

The post-CE/FE recommendations are evaluated using the following two-equation system:

CE/FE-Recommendations=function of (demographics, visit characteristics)  Equation 1

Purchase Outcome=function of (demographics, visit characteristics, IMR, responses to visit)  Equation 2

For now take CE/FE-Recommendations to have been coded as follows:
1. Strong Recommendation
2. Weak Recommendation
3. No Recommendation Further Data
- Demographics (age/gender/occupation/marital status/hobbies etc.)
- What happened during the visit (day/time/duration/windows used/other pages visited/page from/page to/other goods recommended or purchased etc.)
- RFM information on visitor
- Response to the recommendations during this visit (apart from purchase or not)
- Purchase(s) amount(s)

Equation 2 is estimated using either the amount of purchase (then the question is 'how is the amount spent influenced by . . . '), or by a binary variable which is one if there was a purchase and zero if not (then the question is 'how is the decision to purchase or not influenced by . . . ') as the dependent variable. The right hand side contains the identifying variables 'response to the recommendations' as well as the IMR stored from the estimation of Equation 1.

Simple examples are provided below using a small numbers artificial data set.

Starting with a binary (received recommendation or not) discrete choice model for Equation 1:

Equation 1—Question: what relationship exists between the strength of recommendations and various marginal factors?

| Binomial Probit Model Maximum Likelihood Estimates | |
|---|---|
| Dependent variable | BINREC |
| Weighting variable | ONE |
| Number of observations | 100 |
| Iterations completed | 5 |
| Log likelihood function | −60.23445 |
| Restricted log likelihood | −65.34182 |
| Chi-squared | 10.21474 |
| Degrees of freedom | 5 |
| Significance level | .6937447E−01 |

Results retained for SELECTION model.

| Variable | Marginal effect | Standard Error | t-ratio |
|---|---|---|---|
| Constant | −0.72267 | 0.413561 | −1.747 |
| R | 0.00032 | 0.001784 | 0.180 |
| F | 0.04867 | 0.025053 | 1.943 |
| M | −0.00195 | 0.005147 | −0.380 |
| AGE | 0.04035 | 0.019913 | 2.026 |
| AGESQ | −0.05084 | 0.023694 | −2.146 |

Frequencies of actual and predicted outcomes are set forth below. Predicted outcome has maximum probability.

| | Predicted | | |
|---|---|---|---|
| Actual | 0 | 1 | Total |
| 0 | 8 | 28 | 36 |
| 1 | 6 | 58 | 64 |
| Total | 14 | 86 | 100 |

This model can be naturally extended using discrete choice models that allow for more than one choice (e.g. logit). The further possibility exists to use models that allow choices to be ordered (e.g. multinomial logit or ordered probit).

Equation 2.1

Question: Do our recommendations influence the level of expenditure in the Purchase?

| | |
|---|---|
| Ordinary least squares regression | Weighting variable = none |
| Dep. var. = PURCH | Mean = 8.665100014, S.D.= 13.04404784 |
| Model size: | Observations = 100, Parameters = 7, Deg. Fr. = 93 |
| Fit: | R-squared = 0.550307, Adjusted R-squared = 0.49549 |

| Variable | Coefficient | Standard Error | t-ratio |
|---|---|---|---|
| Constant | −4.7720 | 10.2153 | −0.467 |
| R | 0.1292 | 0.0463 | 0.279 |
| F | −0.35058 | 0.1600 | −2.191 |
| M | 0.22663 | 0.1044 | 2.170 |
| AGE | 0.49488 | 0.2070 | 2.390 |
| AGESQE | −0.33741 | 0.1050 | −3.213 |
| LAMDA1 | 2.18606 | 0.6518 | 3.354 |

In this specific case (i.e. with this artificial data etc.) the answer is very clear, that: yes, the recommendations made at the CE/FE level of the software are influencing (on average) the total purchase amount. By how much? The relevant elasticities can be calculated using these coefficients and the data means. However, one should note that a Tobit model would be a better tool to use here and would be used for a large-scale application (as there are a number of observations clustered at the zero point: those who did not purchase).

Where goods of considerably different price belong to the same set of recommendations this is an important question.

Equation 2.2

Question: Do our recommendations influence the choice of whether a purchase is made or not?

| Binomial Probit Model Maximum Likelihood Estimates | |
|---|---|
| Dependent variable | BINPURCH |
| Weighting variable | ONE |
| Number of observations | 64 |
| Iterations completed | 8 |
| Log likelihood function | −17.27683 |
| Restricted log likelihood | −44.33016 |
| Chi-squared | 54.10668 |
| Degrees of freedom | 6 |
| Significance level | .0000000 |

| Variable | Marginal Effect | Standard Error | t-ratio |
|---|---|---|---|
| Constant | −3.9077 | 5.1329 | −0.761 |
| R | −0.0105 | 0.0074 | −1.422 |
| F | −0.0528 | 0.0117 | −4.513 |
| AGE | 0.0811 | 0.0385 | 2.106 |
| AGESQ | −0.0675 | 0.0241 | 2.812 |
| RESP | 0.5618 | 0.1505 | 3.733 |
| LAMDA2 | 1.9169 | 0.7646 | 2.513 |

Frequencies of Actual & Predicted Outcomes

Predicted outcome has maximum probability.

| | Predicted | | |
|---|---|---|---|
| Actual | 0 | 1 | Total |
| 0 | 27 | 6 | 33 |
| 1 | 4 | 27 | 31 |
| Total | 31 | 33 | 64 |

Again, the answer to the question of whether the recommendations influence the decision to purchase or not, is yes as the coefficient of the lambda variable is positive and statistically significant. The marginal effect can reveal the degree to which our recommendations influence the total number of purchases made.

Where all goods within the recommendation category are of rather similar price, the amount spent does not matter and this question is the pertinent one.

Appendix B—Data Structures and Databasesentity Relationships: FIG. 4 Represents the Logical Relationships Among the Entities within the Application:

Triggers/Thresholds: These are described in "Configuration issues", above but require storage of some sort.

Data Definitions: The following is a discussion of the data requirements that lie behind the logical relationships defined above.

Domains

As shown in FIG. 4

| Domains |
|---|
| Domain ID |
| Description |

Subdomains

As shown in FIG. 4

| SubDomains |
|---|
| Owner ID |
| Child ID |

Users (Customers)

The basic data fields required for the customer are:

| Users |
|---|
| ID (imported or created) |
| Lastname (for addressing the user) |
| Firstname (for addressing the user) |
| Salutation (for addressing the user) |
| E-mail address (for pushing e-mails) |
| Company (if representing a company) |
| †User-defined #1 |
| User-defined #2 |

The field "User-defined #2" for customer this might be a weighting factor such as RFM (Recency, Frequency, Monetary Value) in terms of previous site visits and recent purchases.

A note on RFM queries: there is a well-used customer loyalty indicator known as RFM: recency, frequency, monetary value. RFM relates to site visits and activity of site visitors in this instance. R and F are key, as M is indicated by F. The higher each individual value, the higher propensity for imminent purchase and also the potential lifetime value (LTV) of that customer. We will be expected to build into our application the use of RFM to work alongside our model to enhance the predictive capabilities. It is best thought of as a critical weighting factor and is mentioned here because clients taking on the use of the system will almost certainly wish to couple this to some form of RF analysis.

Predictive coefficients (entailment values, self-learning or control values etc.) produced by the system for customers and customer groups can be used in conjunction with existing RF concatenated values to provide the strongest possible behavioural modelling technique that our clients' marketing personnel will want to see. This is best thought of as follows:

1. R and F values are used as indicators of likelihood of purchase once the recommendations are given; and
2. these values are used with other demographics to perform self-learning checks within the application.

The result is that clients maximise the profitability (LTV) potential from existing high RF performers and an indicator is given as to what products and services to promote to the lower RF performers in order that they remain loyal, rise in the RF rankings and increase their LTV to the client.

Accepting the above, the question is how could we embed this in our design if:

the client already has a measure of RF and can supply it (as a simple customer ID value and 'current RF value' for example)

we can pick this up from web/back-end system stats.

UsersLabels

As shown in FIG. 4

Items (Products, Elements)

For Products, the following basic data set is required:

| Items |
|---|
| Item ID (link item or created through registration) |
| Item Domain (if exist) |
| *User-defined #1 |
| *User-defined #2 |
| *User-defined #3 |
| *User-defined #4 |

*User-defined #1-#5 could be, for example, Product Descriptions e.g. a book might be title/author, a car make/model, a CD title/artist etc., or for example, an image of the item.

Labels (Constructs)

This is a repository set up through the system i.e. does not exist prior to using it. The basic data set is:

| Labels |
| --- |
| Label ID |
| Label Name |
| Pole A Text |
| Pole B Text |
| *User-defined #1 |
| *User-defined #2 |

UsersitemsLabels (Item and Label Ranking)

Assumed to be within the UsersItemslabels entity

| UsersItemslabels |
| --- |
| User ID |
| Label ID |
| Item ID |
| Absolute Score value (from slider control measurement) |
| *User-defined #1 |
| *User-defined #2 |

Orders

For purchase histories, it is important for the system to be able to pick up purchase details. There will therefore be an order database reference required with a minimum data set as follows:

| Order |
| --- |
| Order ID |
| User ID |
| Item ID |
| Date |
| Time |
| Value |
| *User-defined #1 |
| *User-defined #2 |

User defined #1-2 could be if the purchase was by credit card or debit card, Credit Rating returned from transaction etc.—useful for Kostas in his experimentation with marginal factors, recommendations and purchases.

Dynamic Label (Construct) Groupings

This is a query that shows all constructs that are strongly bonded; i.e., that have entailment values above or below the trigger values for grouping. The query result shows, at any point in time, all constructs that strongly bond to one another within and across domains and all constructs that Weakly bond to one another within and across all domains. There is no foreseen use for displaying constructs that have no bonds with other constructs.

UsersLabelsEntailments

The system need also store fuzzy entailment values for labels resulting from each session.

| UsersLabelsEntailments |
| --- |
| Label ID #1 |
| Label ID #2 |
| User ID |
| Session No |
| Entailment Value |

UsersItemsEntailments

| UsersItemsEntailments |
| --- |
| Item ID #1 |
| Item ID #2 |
| User ID |
| Session No |
| Entailment Value |

CumulativeUsersLabelsEntailments

We need to be able to store cumulative entailment values for Labels and Items resulting from prior sessions.

| CumulativeUsersLabelsEntailments |
| --- |
| Label ID #1 |
| Label ID #2 |
| User ID |
| Total number of sessions (calculated) |
| Cumulative Entailment Value* (calculated) |

*Could be average of adding all values from UsersLabelsEntailments and dividing by total number of sessions.

CumulativeUsersItemsEntailments

The system must able to store cumulative entailment values for Labels and Items resulting from prior sessions.

| CumulativeUsersItemsEntailments |
| --- |
| Item ID #1 |
| Item ID #2 |
| User ID |
| Total number of sessions (calculated) |
| Cumulative Entailment Value* (calculated) |

*Could be average of adding all values from UsersItemsEntailments and dividing by total number of sessions.

Recommendations

The system stores Item IDs that have been recommended to a user for comparison with orders (purchases).

| Recommendations |
| --- |
| Item ID |
| User ID |
| Recommendation level - strong/weak |
| Time of recommendation |
| Date of recommendation |
| Purchased within <trigger level> days* |

This is a measure of purchasing behaviour, which will help measure system performance.

Appendix C—Fischer Linear Discriminant Analysis

The mean of class i is given by $$m_i = \frac{1}{N_i} \sum_{x \in w_i} x$$

Where x is the vector of characteristics.

Mean of samples projected onto a linear discriminant plane w:

$$\tilde{m}_i = \frac{1}{N_i} \sum_{y \in w_i} y$$

$$\tilde{m}_i = \frac{1}{N_i} \sum_{x \in w_i} w^T x$$

$$\tilde{m}_i = w^T m_i$$

The separation of the projected means between class 1 and class 2:

$$w^T(m_1 - m_2)$$

Scatter matrix of the projected means:

$$\tilde{s}_i^2 = \sum_{y \in w_i} (y - \tilde{m}_i)^2$$

The Fisher criterion is the ratio:

$$\frac{|\tilde{m}_1 - \tilde{m}_2|^2}{\tilde{s}_1^2 + \tilde{s}_2^2}$$

We define $$S_i = \sum_{x \in w_i} (x - m_i)(x - m_i)^T$$

$$S_W = S_1 + S_2$$

$$\tilde{s}_i^2 = \sum_{x \in w_i} (w^T x - w^T m_i)^2 \Rightarrow \tilde{s}_i^2$$

$$= \sum_{x \in w_i} w^T (x - m_i)(x - m_i)^2 w \Rightarrow w^T$$

$$= S_i w \quad \text{and}$$

$$\tilde{s}_1^2 + \tilde{s}_2^2 = w^T S_W w.$$

Similarly, $$(\tilde{m}_1 - \tilde{m}_2) = (w^T m_1 - w^T m_2)^2 \Rightarrow (\tilde{m}_1 - \tilde{m}_2)$$

$$= w^T (m_1 - m_2)(m_1 - m_2)^T w \Rightarrow (\tilde{m}_1 - \tilde{m}_2)$$

$$= w^T S_B w$$

where $S_B = (m_1 - m_2)(m_1 - m_2)^T$.

$S_W$ is known as the 'within class' scatter matrix $S_B$ is known as the 'between class' scatter matrix The criterion to maximise is $$J(w) = \frac{w^T S_B w}{w^T S_W w}$$

Differentiating with respect to w gives:

$$\frac{2 S_B w (w^T S_W w) - 2 S_W w (w^T S_B w)}{\{w^T S_W w\}^2} = 0$$

So the solution must satisfy $$S_B = \alpha S_w w$$

where $\alpha$ is the ratio $$\alpha = \frac{(w^T S_B w)}{(w^T S_W w)}$$

Since $S_B w$ is in the same direction as $(m_1 - m_2)$ $$w = \beta S_w^{-1}(m_1 - m_2)$$

As we only require the direction of w for the discriminant function the magnitude is unimportant, as is the value of $\beta$.

The invention claimed is:

1. A data management system for identifying patterns in data related to an item for which a recommendation is provided from the system to a user, the data management system comprising:
    a host computer system having:
    a construct repository configured to retain a plurality of construct pair reference sets, each construct pair reference set comprising at least a first descriptive term and a second descriptive term, the first descriptive term and the second descriptive term selected according to personal construct theory to represent contrasting opinions;
    a graphical user interface configured to display a user-selectable control related to displayed construct pair reference sets of the plurality of retained construct pair reference sets and further configured to receive a particular user's opinion score selected between the first descriptive term and the second descriptive term of each of the displayed construct pair reference sets, the graphical user interface further configured to store in the construct repository the opinion scores received from the particular user for the displayed construct pair reference sets; and
    an analysis engine configured to analyze relationships among a plurality of received user opinions for construct pair reference sets retrieved from the construct repository in which the analysis engine analyses responses made by the particular user using a statistical process based on a mesh to identify a set of users to which the particular user belongs and to generate a recommendation for the particular user related to an item based on the degree to which the particular user is proximal in profile to others in the set, wherein the mesh has a value that is based on the difference in opinion scores between two or more user inputs.

2. The data management system according to claim 1 in which the particular user inputs a score representative of their opinion by adjustment of a position of a control provided by the graphical user interface.

3. The data management system according to claim 1 in which the results of the analysis are further used to deduce a set of information items of interest to the particular user.

4. The data management system according to claim 1 in which the system executes on a server that communicates with the particular user over a network link.

5. The data management system according to claim 1 that includes a user data input component that executes on a remote host system.

6. The data management system according to claim 5 in which the data input component is represented in the display generated by a web browser.

7. The data management system according to claim 5 in which the data input component is generated by an applet that is downloaded to the remote host from the server.

8. The data management system according to claim 1 in which the construct pair reference set is obtained through use of a repertory grid in accordance with personal construct theory.

9. The data management system according to claim 1 in which incomplete data is processed by matching those parts of the data that are present with characteristics of existing data.

10. The data management system according to claim 9 in which the incomplete data is subject to discriminant analysis.

11. The data management system according to claim 1 in which data is subject to a process of linearisation prior to being analysed.

12. The data management system according to claim 11 in which the process of linearisation includes conversion of non-numeric data to a numeric form.

13. The data management system according to claim 1 in which users are the customers of a business and wherein the output from the analysis engine includes predictive information as to the future purchasing behaviour of the customers.

14. The data management system of claim 1 in which the item is selected from one of a person, a product, a service, a topic, a concept, an event, and an experience.

15. The data management system of claim 1 wherein the user-selectable control is configured to have a discrete number of settings for receiving the user's opinion about the aspect of the item.

* * * * *